United States Patent [19]
Saenger

[11] Patent Number: 5,721,492
[45] Date of Patent: Feb. 24, 1998

[54] ELECTRICAL LOGGING SENSOR HAVING CONDUCTIVE AND INSULATING PORTIONS FORMED BY LAYER DEPOSITION OF HARD MATERIALS AND ITS METHOD OF MANUFACTURE

[75] Inventor: Richard G. Saenger, Chatillon sous Bagneux, France

[73] Assignee: Schlumberger Technology Corporation, Houston, Tex.

[21] Appl. No.: 565,186

[22] Filed: Nov. 28, 1995

[30] Foreign Application Priority Data

Nov. 29, 1994 [FR] France ............................. 94 14291

[51] Int. Cl.$^6$ ......................................................... G01V 3/20
[52] U.S. Cl. ............................. 324/347; 324/366; 324/373
[58] Field of Search ............................. 324/347, 367, 324/369, 374; 166/66, 254.2; 175/50; 29/884, 885

[56] References Cited

U.S. PATENT DOCUMENTS

| 3,072,843 | 1/1963 | Clements et al. | 324/347 |
| 3,268,801 | 8/1966 | Clements et al. | 324/347 X |
| 3,388,325 | 6/1968 | Birdwell et al. | 324/347 X |
| 4,602,690 | 7/1986 | Steiger . | |
| 4,666,733 | 5/1987 | Wlodek . | |
| 4,997,044 | 3/1991 | Stack . | |
| 5,036,283 | 7/1991 | Trouiller et al. . | |
| 5,038,108 | 8/1991 | Lessi et al. . | |
| 5,162,740 | 11/1992 | Jewell | 324/347 |
| 5,235,285 | 8/1993 | Clark et al. . | |
| 5,396,175 | 3/1995 | Seeman . | |

FOREIGN PATENT DOCUMENTS

| 0 327 422 | 8/1989 | France . |
| 2 130 380 | 5/1984 | United Kingdom . |
| 2 253 908 | 9/1992 | United Kingdom . |

Primary Examiner—Gerard R. Strecker
Attorney, Agent, or Firm—J. J. Ryberg

[57] ABSTRACT

A sensor element especially adapted for use in borehole resistivity logging, having an outside surface comprising conductive portions and insulating portions distributed in a determined pattern, said conductive and insulating portions being made respectively of a material that is hard and electrically conductive and of a material that is hard and electrically insulating, each of said materials being deposited in the form of a layer.

26 Claims, 15 Drawing Sheets

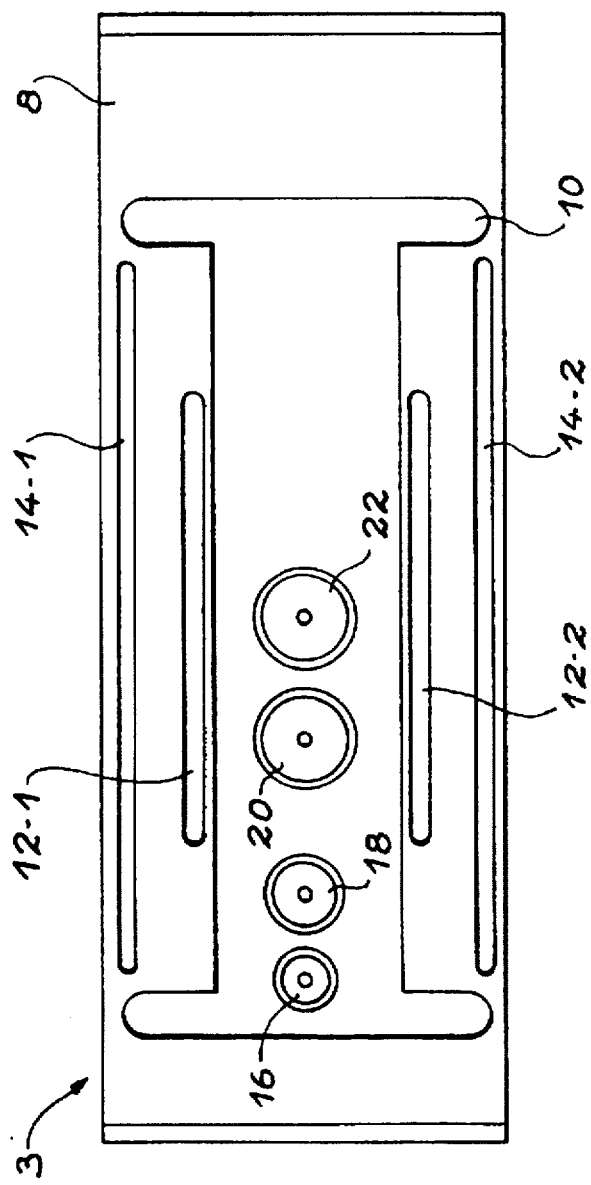
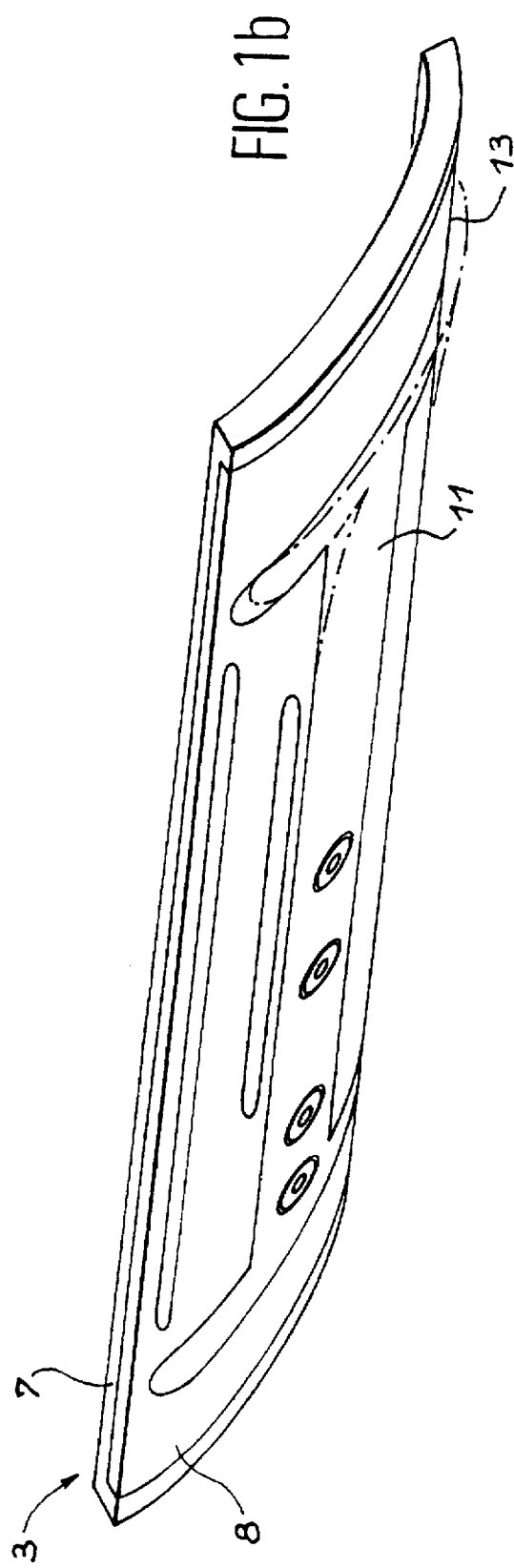
FIG.1a
FIG.1b

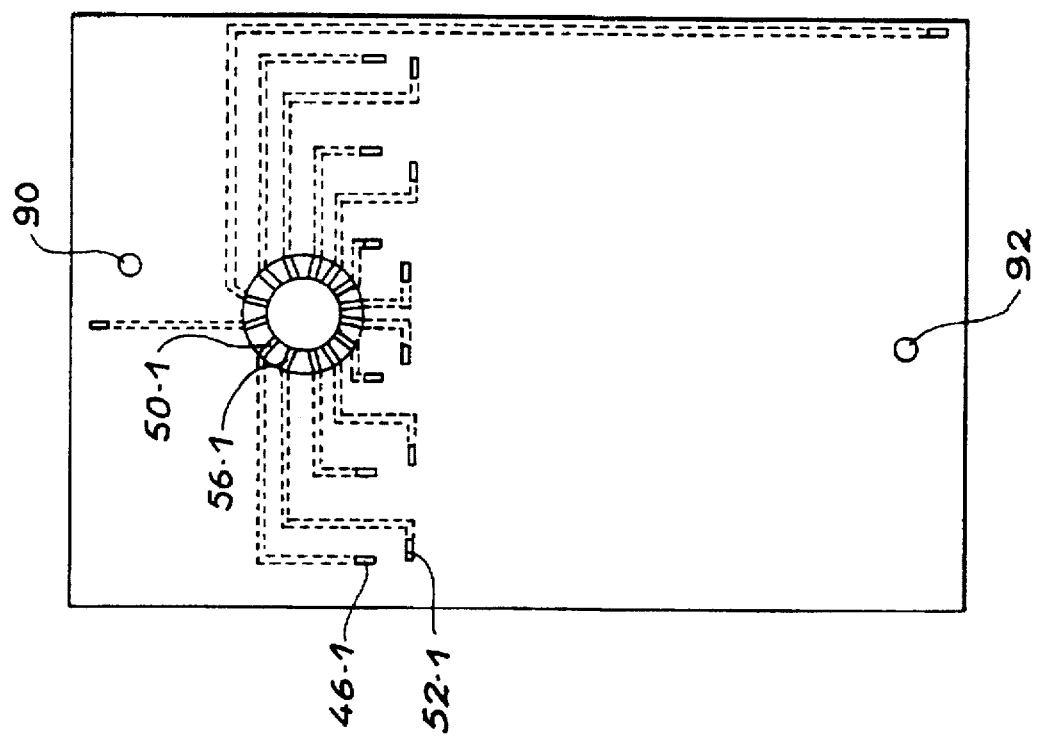
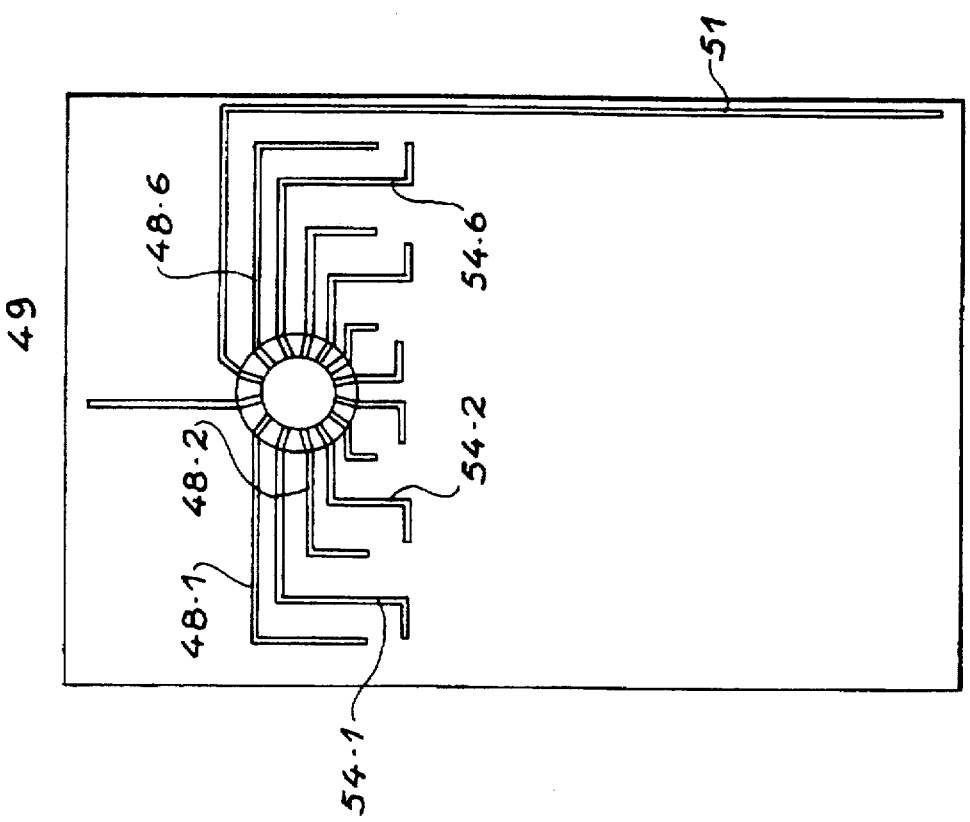
FIG. 9c
FIG. 9b

ELECTRICAL LOGGING SENSOR HAVING CONDUCTIVE AND INSULATING PORTIONS FORMED BY LAYER DEPOSITION OF HARD MATERIALS AND ITS METHOD OF MANUFACTURE

TECHNICAL FIELD AND OF THE INVENTION

The present invention relates to the field of measurement tools suitable for use in borehole equipment for oil prospecting and production.

DESCRIPTION OF THE PRIOR ART

More specifically, after a well has been drilled, logging instruments, in particular electrical or electromagnetic sensors, are lowered into the well for the purpose of taking measurements that enable characterization of the fluids present in the formations and the beds traversed by the borehole as well as determination of the dip of said beds.

Accompanying FIGS. 1a and 1b are diagrams showing an example of a logging sensor, of the type comprising electrodes on a pad. Such a sensor and its operation are also described in document EP-A-384 823. FIGS. 1a and 1b show a pad 3 comprising a stainless steel support 7 covered in a layer 8 of hard robber in which electrodes 10–22 are embedded. The outside surface 11 of each electrode should normally be flush with the outside surface 13 of the layer of rubber, as in FIG. 1b. The pad is designed to be held, during measurement, against the wall of the borehole by means of a system of retractable arms, hinged to a sonde that is lowered down the borehole on an electrical cable, to a depth that may be as much as several kilometers. In general, analysis current I is injected into the formations around electrodes 16, 18, 20, and 22 (FIG. 1a). The electrode 10 is a guard electrode and it serves to inject focusing current. Electrodes 12-1 and 12-2 are monitoring electrodes and electrodes 14-1 and 14-2 are focusing electrodes through which another focusing current is injected. Detailed operation of the device is described in the above-mentioned document.

The conditions in which such apparatus needs to operate can be extremely severe: temperature may be high (as much as 175° C. or higher), the pressures encountered are commonly in the range 700 bars to 1400 bars, and the materials may be in contact with aggressive fluids (HCl, H₂S, etc.).

In addition, the sensors and their environment are sometimes subjected to mechanical stresses that are very intense. Thus, in the device described with reference to FIGS. 1a and 1b, the outside surface is held in rubbing contact against the walls of the borehole, and this may continue over distances that are considerable. After being used on a single occasion, some of the surfaces may be worn to a depth of 1.5 mm, whereas to ensure measurement reproducibility, it is necessary to keep maximum wear to no more than about 0.2 mm.

In addition, such mechanical stresses and rubbing can cause the sensor to become deformed. In practice, as shown in FIG. 1b, it is not unusual to find after use on a single occasion that an electrode, such as the electrode 10, has deformed so much that its outside surface 11 projects from the surface 13 (the deformed electrode is shown in chain-dotted lines). Under such circumstances, it is clear that the only solution is to change the entire sensor, and that is extremely expensive.

All such conditions (temperature, mechanical) naturally have an influence on the signal or the response of the sensors, whatever kind of sensor is concerned.

Furthermore, another phenomenon can arise which, although not due to wear proper of the sensor, is nevertheless detrimental to measurement. Taking the example of a resistivity sensor such as that shown in FIG. 1a, resistivity logs are obtained such as that shown in FIG. 2. The variations associated with the nature of the beds being logged as illustrated by curve 31 have interference peaks 26, 28, 30, and 32 superposed thereon, which peaks are known "spikes". The origin of such spikes is associated with particles or lumps of matter coming from the formations being logged and which attach to the active surface of the sensor (in this case the electrode 10). When they become detached from said surface, a sudden change in the conductivity of the electrode occurs, and the sensor responds thereto in a manner that gives rise to an interfering spike appearing. This phenomenon is associated with the state and with the nature of the surface of the sensors and with the passivation layer being torn off.

Another known type of resistivity sensor, is mounted on a curved former and is shown diagrammatically in FIGS. 3a and 3b. This sensor and its operation are also described in document EP-A-544 583. FIG. 3a is a side view of the sensor while FIG. 3b is a half-section on AA'. Reference 21 designates a half-shell constituted by a metal substrate 23 that is cylindrical in shape, and by a rubber coating 25 in which there are received azimuth electrodes 27-1, . . . , 27-6 for injecting current, and azimuth monitoring electrodes 29-1, . . . , 29-6 situated in the centers of the electrodes 27 and insulated therefrom. Other monitoring electrodes 33 and 35 are disposed at the ends of the device. The electrodes are connected to their electrical supplies by means of wires that are embedded in the rubber 25, and that are collected together at a base 39 welded on the inside face of the substrate 23, which base is extended by a connector 41 that is water and gas-tight.

In use, this sensor is inserted in a tubular sonde that is lowered down a borehole at the end of a cable and that is held centered in the borehole.

The sensor is designed to be used in a medium where the temperature can be high (up to 175° C.) and the pressure can be very large (up to 1400 bars). In addition, its outside surfaces are in contact with aggressive fluids (HCl, H₂S, . . . , etc.). Like the first type of sensor described above, it is therefore important that said surfaces can withstand such conditions, which is not always the case with known sensors.

Finally, such sensors are difficult and expensive to make insofar as they require numerous components: a substrate, electrodes, a base which needs to be welded, a connector, rubber envelopes, and insulators.

SUMMARY OF THE INVENTION

According to an aspect of the present invention, there is provided a sensor element adapted for use in a borehole and having an outside surface comprising conductive portions and insulating portions arranged in a predetermined pattern, said conductive and insulating portions being made of hard materials which are respectively electrically conductive and electrically insulating, each of said materials being deposited in the form of a layer.

Such sensor element is particularly suitable for use in a resistivity logging tool.

According to another aspect, the invention provides an electrical measurement sensor comprising:

a metal support having an outside surface and an inside surface;

a first layer of a material that is hard and electrically insulating deposited on the outside surface of the support;

a layer of a material that is hard and electrically conductive deposited on a portion of the first layer and defining one or more electrodes;

at least one electrical through connection disposed inside or against the inside surface of the metal support;

electrically link elements deposited on the first layer, each having a first end connected to an electrode and a second end connected to one of the through connections; and a second layer of a material that is hard and electrically insulating, covering at least some of the link elements.

The invention also provides a method of manufacturing an electrical measurement sensor, the method comprising the following steps:

depositing a first layer of a material that is hard and electrically insulating on the outside surface of a metal support;

depositing a layer of a material that is hard and electrically conductive on a portion of the first layer, thereby defining at least one electrode;

forming at least one electrical through connection inside the metal support or against its inside surface;

depositing electrical link elements on the first layer, a first end of each element being connected to an electrode and a second end thereof being connected to one of the through connections; and depositing a second layer of a material that is hard and electrically insulating on at least some of said link elements.

Other aspects of the invention appear in the dependent claims.

BRIEF DESCRIPTION OF THE DRAWINGS

The characteristics and advantages of the invention appear more clearly on reading the following description. The description relates to embodiments given by way of non-limiting explanation, and it refers to the accompanying drawings, in which:

FIGS. 1a and 1b are described above and show a prior art electrical measurement sensor;

FIGS. 9a to 9d show steps in a method of manufacturing a sensor of the invention;

DETAILED DESCRIPTION OF EMBODIMENTS OF THE INVENTION

Figure 4A:
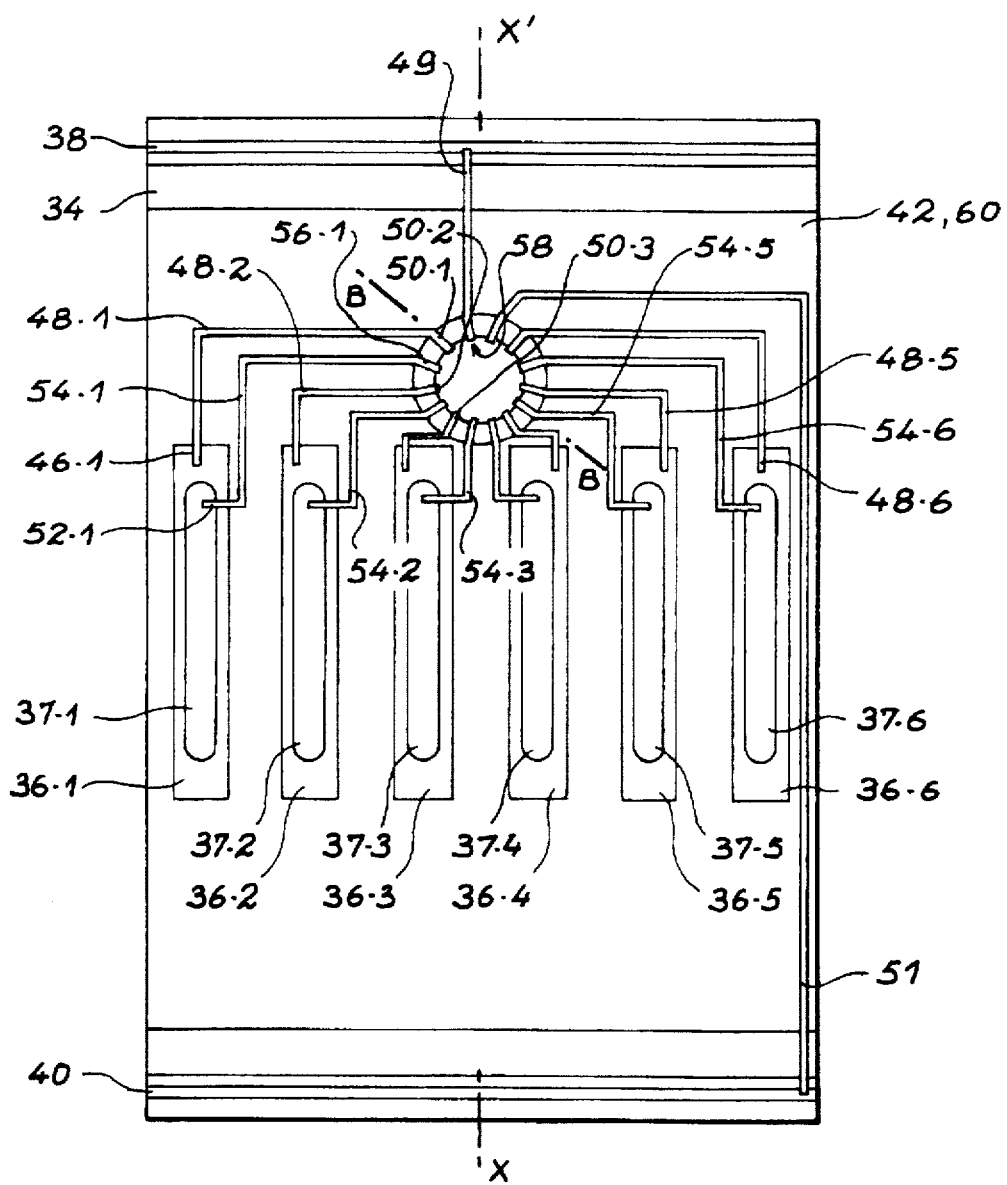
FIGS. 4a and 4b show a sensor of the invention.
Figure 4B:
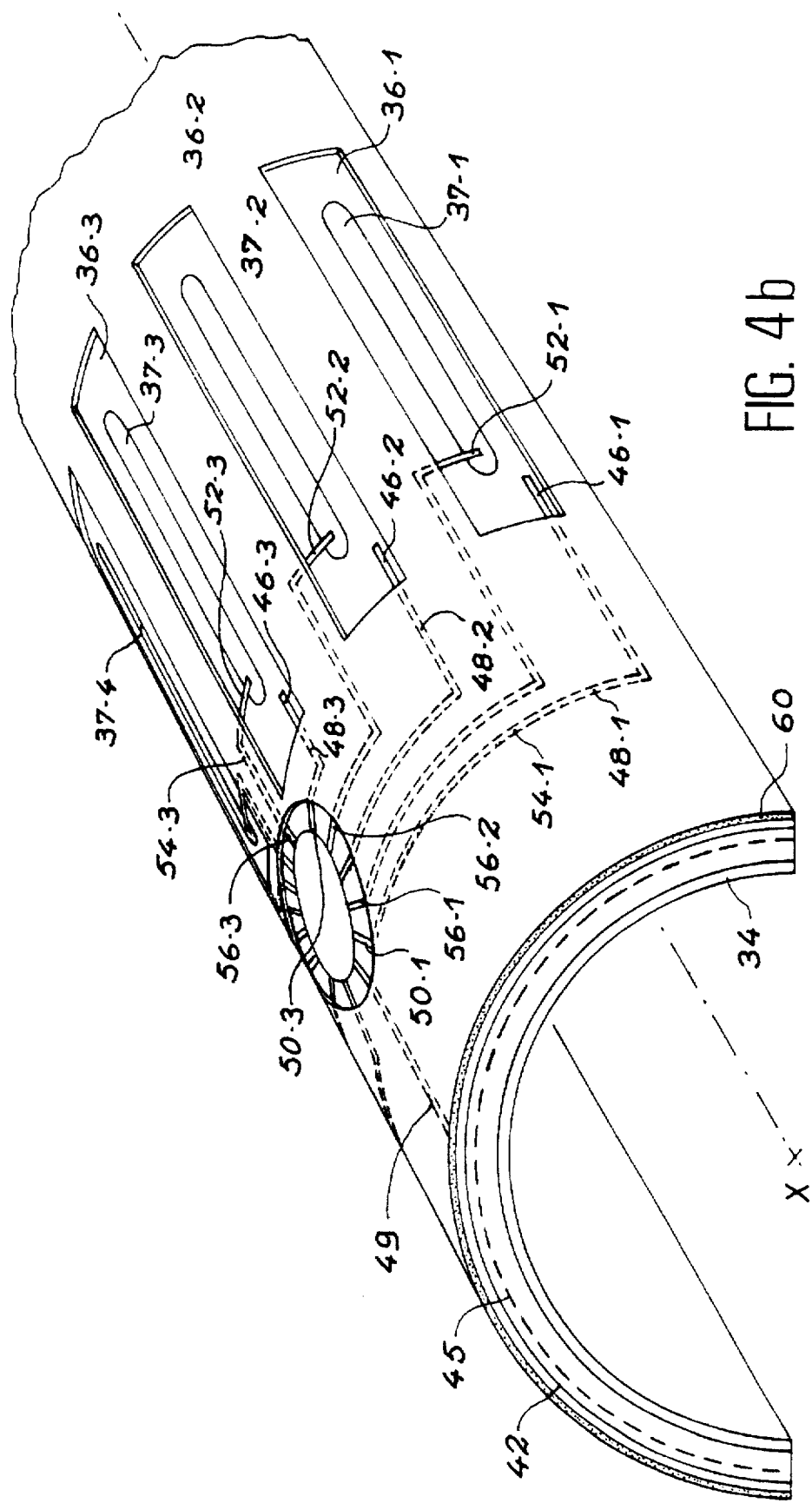

A first embodiment of a sensor of the invention for use in a device of the type described in document EP-A-544 583 is shown in FIGS. 4a and 4b. FIG. 4a is a side view of the device, while FIG. 4b shows half of it in a perspective view.

The sensor or the sensor element shown has an outside surface constituted firstly by conductive portions 36-1, . . . , 36-6, 37-1, . . . , 37-6, and insulating portions 42 which are formed respectively of a material that is hard and electrically conductive and of a material that is hard and electrically insulating, said materials being deposited in the form of layers. The layers are preferably deposited on a substrate in the form of a sector of a cylinder. For a sensor element such as that shown in FIG. 4a, the cylinder sector is in fact a half-cylinder, so a sensor is built up from two sensor elements.

When the invention is applied to making a sensor element of the type shown in FIGS. 1a and 1b, then, in the same manner, the element presents an outside surface made up of conductive portions and of insulating portions respectively made of materials that are hard and electrically conductive, and hard and electrically insulating. The conductive and insulating portions are then distributed in a given pattern that is different from the pattern shown in FIG. 4a, and that corresponds to the pattern of FIG. 1b. In this case, the cylindrical sector also extends over an angle of about 72°.

In more detailed manner, the sensor element of FIG. 4a comprises a support or substrate 34 made of metal, e.g. a 316-L type stainless steel, electrodes 36-1, 36-2, . . . , 36-6 for injecting current, and monitoring electrodes 37-1, . . . , 37-6 that are elongate in shape parallel to an axis XX' of circular symmetry of the metal support 34, and insulated from the current injection electrodes. Two annular monitoring electrodes 38 and 40 are disposed around the support 34.

As can be seen from FIG. 4b, the support 34 is coated in a first layer 42 of material that is hard and electrically insulating. The electrodes 36 and 37 are formed by depositing a layer of a material that is hard and electrically conductive on portions of said first layer. Connection means constituted by connection tabs 46-1, 46-2, . . . , 46-6 and 50-1, 50-2 . . . , 50-6 and by electrical link elements 48-1, . . . , 48-6 serve to connect the current injection electrodes 36-1, . . . , 36-6 to an external current feed (not shown) via connection means 58 (referred to below as the "through connection") disposed on the inside or against the inside surface of the support 34 and described in greater detail below. Only one through connection is shown in FIG. 4a. However it is possible to provide a device such that some of the electrodes are connected to a first through connection while other electrodes are connected to a second through connection. Similarly, the monitoring electrodes 37-1, . . . , 37-6 are connected to electrical outlets or to voltage measuring means (not shown) via through connection means 52-1, . . . , 52-6; 54-1, . . . , 54-6; and 56-1, . . . , 56-6.

The electrical link elements such as the elements 48 may be conductive tracks, e.g. made of nickel or of copper, of the type used in printed circuit technology. The elements 48 may also be electric wires.

Conductive tracks 49, 51 connect the monitoring electrodes 39, 40 to voltage measuring means via the through connection 58.

A second layer 60 of a material that is hard and electrically insulating covers the entire assembly with the exception of zones that correspond to the electrodes (36-1, . . . , 36-6, 37-1, . . . , 37-6). alternatively, the second layer 60 may be of limited extent, so as to avoid covering the electrical link elements 48-1, . . . , 48-6, 54-1, . . . , 54-6, extending a little way on either side of these elements.

The materials of the layers 42 and 60 may be selected from oxides such as $SiO_2$, $TiO_2$, $Al_2O_3$, $ZrO_2$, $Cr_2O_3$, and $Y_2O_3$ which have very good properties of hardness and resistance to corrosion and to wear.

The material from which the conductive zones 36 and 37 is made may be of the carbide type ($B_4C$, SiC, $Be_2C$, TiC, WC, TaC, NbC, $Cr_3C_2$, b-$Mo_2C$, h-MoC, VC, HfC, ZrC), optionally doped, e.g. with cobalt, nickel, chromium, or a ternary mixture such as nickel-chromium-molybdenum (NiCrMo).

In order to enhance bonding of the first layer 42 of hard and insulating material on the substrate 34, it is possible to deposit a bonding layer 45 directly onto the substrate 34 before depositing the layer 42 (where the bonding layer is shown as a dashed line in FIG. 4b), the bonding layer being made of a material such as MCrAlY where M is a metal such as nickel (Ni) or a material such as NiAl, or else molybdenum.

This bonding layer also makes it possible:

- to restrict possible thermal expansion differences between the substrate 34 and the coating 42; to this end, it is possible to select a material that has an expansion coefficient intermediate between that of the substrate 34 and that of the layer 42; and
- to protect the substrate against possible corrosion (particularly when the bonding layer is made of NiAl or of MCrAlY).

Of the materials mentioned above, it is preferred to use NiCrAlY. In particular, it has the property of developing a ceramic lattice in its bulk, when it is in oxidizing conditions. This enhances bonding of coatings constituted by oxides and/or carbide, in particular in conditions of a highly corrosive atmosphere.

The various materials are chosen as a function of the stresses imposed while the device is in use, and in particular stresses that are mechanical, thermal, and chemical.

Various parameters enable the mechanical properties of the substrates used in combination with the selected coatings to be characterized more precisely: hardness; thermal expansion coefficient; breaking strength; elastic limit; extension coefficient in bending; and resistance to wear. These parameters are described in detail below.

Firstly, for all of the materials in the list given above, Table I gives the corresponding hardness in $N/mm^2$, and also the thermal expansion coefficient.

TABLE I

| Material | Hardness ($N/mm^2$) | Thermal expansion coefficient ($\times 10^{-6}/°C$.) |
|---|---|---|
| Diamond | 7600 | 0.9–1.18 |
| $B_4C$ | 2940 | 6.0 |
| SiC | 2580 | 5.7 |
| $Be_2C$ | 2690 | 7.4 |
| TiC | 3000 | 7.74 |
| WC | 2500 | 5.2–7.3 |
| TaC | 1800 | 6.29 |
| NbC | 2000 | 6.65 |
| $Cr_3C_2$ | 1350 | 10.3 |

TABLE I-continued

| Material | Hardness ($N/mm^2$) | Thermal expansion coefficient ($\times 10^{-6}/°C$.) |
|---|---|---|
| b-$Mo_2C$ | 1500 | 7.8 |
| h-MoC | 2200 | 7.8 |
| VC | 2900 | 7.2 |
| HfC | 2600 | 6.59 |
| ZrC | 2700 | 6.73 |
| $Al_2O_3$ | 2100 | 6.2 |
| $B_2O_3$ | 2100 | 6.2 |
| $Cr_2O_3$ | 2900 | 9.6 |
| $TiO_2$ | 1100 | 8.19 |
| $ZrO_2$ | 1200 | 7.2 |

Figure 5:
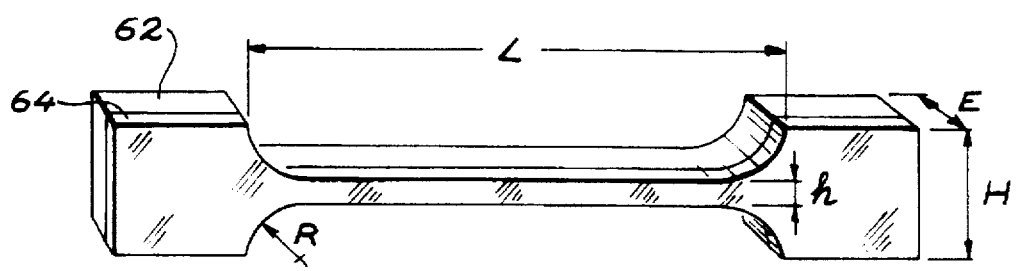
FIGS. 5 and 6 show test pieces for testing the mechanical properties of substrates covered by coatings used in the present invention.

Tension tests have been performed that enable comparisons to be made between the tensile properties of a steel (316-L type stainless steel) without any layer of hard material and the properties of the same steel when coated in a layer of tungsten carbide doped with cobalt CW(Co) or in a layer of chromium trioxide $Cr_2O_3$. Standardized test pieces were used, of the type shown in FIG. 5, where references 62 and 64 designate respectively the steel substrate and the deposited layer of carbide or of oxide.

The following values were used for the geometrical parameters: L=60 mm, H=12 mm, h=4 mm, R=4 mm, E=2.5 mm, e=250 μm (plus an NiCrAlY bonding layer of 50 μm).

Tests were performed under the following conditions: starting load=1.8N; linear speed=3 mm/min.

The results obtained are given in Table II. In all three cases, comparisons were made between the values of the breaking load (Rm in MPa), of the elastic limit Rp (0.2 Rp in MPa), and of the expansion coefficient A (in %). For each quantity, the percentage value given in parentheses indicates the relative difference compared with the same quantity measured on a substrate without any coating.

TABLE II

| | Rm (MPa) | Rp 0.2 (MPa) | A (%) |
|---|---|---|---|
| 316-L | 578 | 267 | 53 |
| 316-L + CW(Co) | 587 (+2–3%) | 307 (+10–13%) | 44 (−17–18%) |
| 317-L + $Cr_2O_3$ | 515 (−10%) | 278 (+5%) | 41.6 (−21%) |

From these results, it can be seen that the effect of the coatings is to divide the elongation of the substrate by a factor of about 1.2, and to improve the elastic limit of the substrate. When the coating is made of $Cr_2O_3$, the value of the breaking load is lower than in the absence of the coating. Nevertheless, it can be concluded from these values that the overall mechanical qualities of the device are improved by the presence of a substrate.

Figure 6:
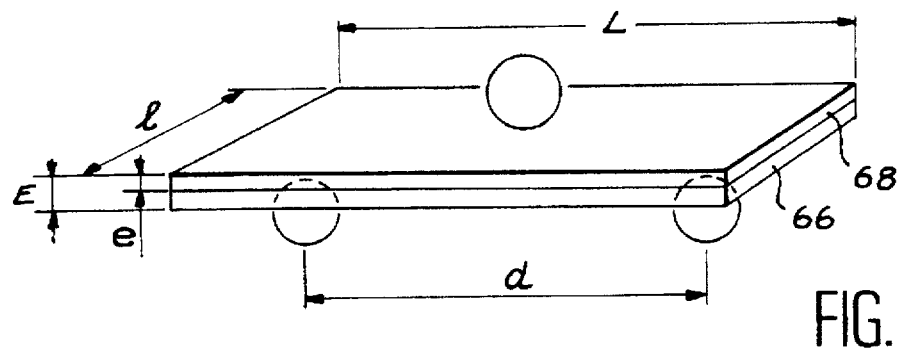

Standard tests (ENV 658-3/92) have also been performed in bending (3-point test) on test pieces of the kind shown in FIG. 6, where references 66 and 68 designate respectively the steel substrate and the deposited layer of carbide or of oxide.

The following geometrical parameters were used: L=60 mm, φ=10 mm; E=2.5 mm, e=250 μm (plus an NiCrAlY bonding layer of 50 μm), d=50.05 mm, φ=20 mm.

Four substrates 66 of different kinds were used (Abramax steel, 316-L stainless steel, aluminum, copper). For each substrate, with two different coatings (CW(Co) and $Cr_2O$) Table III gives the extension G (in mm) before the appearance of cracking, and also the extension coefficient A=dl/l, likewise before the appearance of cracking.

TABLE III

| Substrate | σ(mm) | | A(%) | |
| --- | --- | --- | --- | --- |
| | $Cr_2O_3$ | CW(Co) | $Cr_2O_3$ | CW(Co) |
| Abramax | 4.3 | 5.3 | 14 | 18 |
| 316-L stainless | 3.5 | 3.2 | 12 | 11 |
| Aluminum | 4.5 | 3.6 | 15 | 13 |
| Copper | 2.9 | 2.35 | 10 | 8 |

Wear tests have also been performed. These tests compare the wear resistance of three types of coating when subjected to friction from an alumina sphere.

Three types of sample were used: an Abramax steel (or "Creusabro 32") without a coating and coated in CW(Co) and in $Cr_2O_3$.

Test conditions were as follows: load=75N, frequency= 0.5 Hz, number of cycles=2000.

The results are given in Table IV.

The first column gives final roughness $R_a$ (in μm); the second and third columns give the starting and average coefficients of friction during the test; the fourth column gives the volume worn away (in $mm^3$); the fifth column gives wear rate (in $mm^3/Nm$); and the sixth column gives the wear (in mg) of the alumina sphere.

TABLE IV

| Material | $R_a$ (μm) | Initial friction | Average friction | Worn volume ($mm^3$) | Wear rate ($mm^3/Nm$) | Sphere wear (cm) |
| --- | --- | --- | --- | --- | --- | --- |
| Abramax | 1–1.2 | 0.24–0.27 | 0.64–0.72 | 7.4–11.8 | $82 \times 10^{-5}$– $131 \times 10^{-5}$ | 0.4–5.9 |
| Abramax + CW(Co) | 14–16 | 0.36–0.38 | 0.46–0.47 | 0.25–0.5 | $3 \times 10^{-5}$– $6 \times 10^{-5}$ | 1.7–2.5 |
| Abramax + $Cr_2O_3$ | 4–4.6 | 0.5–0.82 | 0.52–0.73 | 0.8–2.9 | $8 \times 10^{-6}$– $32 \times 10^{-5}$ | 0.1–0.3 |
| | 4–4.6 | 0.59–0.65 | 0.56–0.63 | 0.5 | $6 \times 10^{-5}$ | 0.1–0.3 |

The samples show that two types of wear predominate: abrasive wear and adhesive wear. Abrasive wear appears in the form of stripes and extracted particles, adhesive wear in the form of transfer of material.

Table IV shows the improvement obtained on going from a substrate without coating to a substrate with a coating, whether in terms of final roughness, worn volume, rate of wear, or wear of the sphere.

The chemical resistance of the coatings were tested using the $Cr_2O_3$ and the CW(Co) coatings.

Four different substrates (copper, Abramax steel, 316-L stainless steel, and aluminum) were tested, each with a $Cr_2O_3$ coating and with a CW(Co) coating. Tests were performed in a saturated NaCl solution (300 grams per liter (g/l)), with an initial pressure of 4 bars of $H_2S$ at ambient temperature, followed by an addition of 40 bars of $CO_2$ at ambient temperature, bringing to equilibrium at a temperature of 160° C., and increasing the pressure to 100 bars using nitrogen, the total duration of each test being 100 hours. In all cases, it was observed that both types of coating provided good resistance.

In addition, all of the coatings tested presented good resistance to a solution of HCl acid under conditions that can be found in boreholes (<15% HCl).

Finally, the contact impedance of the various coatings was measured. The portions that serve as electrodes (references 36 and 37 in FIGS. 4a and 4b) must present low contact impedance in order to perform proper resistivity measurements.

Figure 7A:
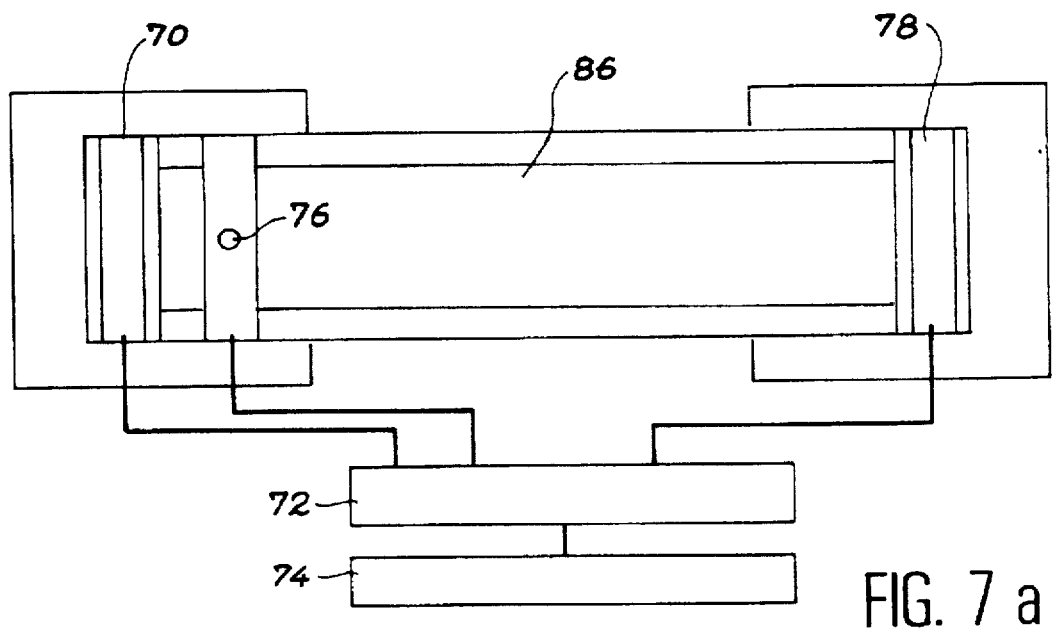
FIG. 7a and 7b show one method of characterizing the coating in terms of contact impedance.
Figure 7B:
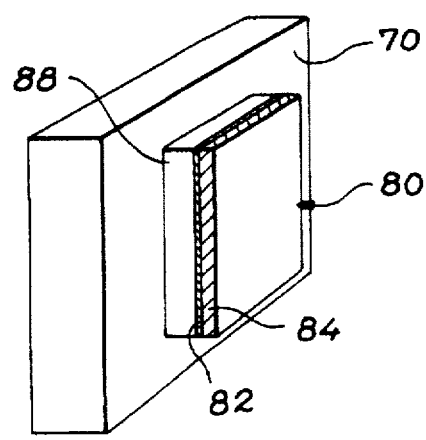

The apparatus for performing these tests is shown diagrammatically in FIG. 7a. The rectangular shape of the electrolyte bath 86 tends to ensure current lines that are rectilinear, and it is thus possible to establish equipotential lines (which are perpendicular to the current lines). References 70, 76, and 78 designate respectively the test electrode, the reference electrode, and the counter-electrode. The solution 86 is an electrolytic solution of NaCl at 100 g/l (T=298 K). As shown in FIG. 7b, each test electrode 70 (2.8×3.3 $cm^2$) supports an active cell 80 (1.3×2 $cm^2$) itself constituted by a substrate 88, a bonding layer 82 of NiCrAlY (thickness=50 μm) and a ceramic layer 84 (CW(Co) or CW(Ni) or CW(NiCrMo), having a thickness of 200 μm to 500 μm).

The three electrodes 70, 76, and 78 are coupled to an electrochemical interface 72 and to a frequency analyzer 74.

Tests were performed using tungsten carbide (CW) and various dopings of cobalt, nickel, or of the Ni+ refractory type (e.g. NiCrMo). The tests with cobalt doping were performed using a reference electrode made of 316-L stainless steel, while the other tests were made with a reference electrode made of platinum. Additional tests using a platinum reference electrode and cobalt doping at 12% and at 100% have served to demonstrate that the choice of reference electrode does not alter the result.

The contact impedances for various dopings and at two working frequencies (10 Hz and 100 Hz) are given in Table V.

TABLE V

| | Contact impedance (Ω · $cm^2$) | |
| --- | --- | --- |
| | 10 Hz | 100 Hz |
| CW + 12% Co | 20 | 10 |
| CW + 17% Co | 30 | 15 |
| CW + 20% Co | 35 | 15 |
| CW + 100% Co | 95 | 35 |
| CW + 17% Ni | 30 | 15 |
| CW + NiCrMo | 25 | 10 |

Figure 8:
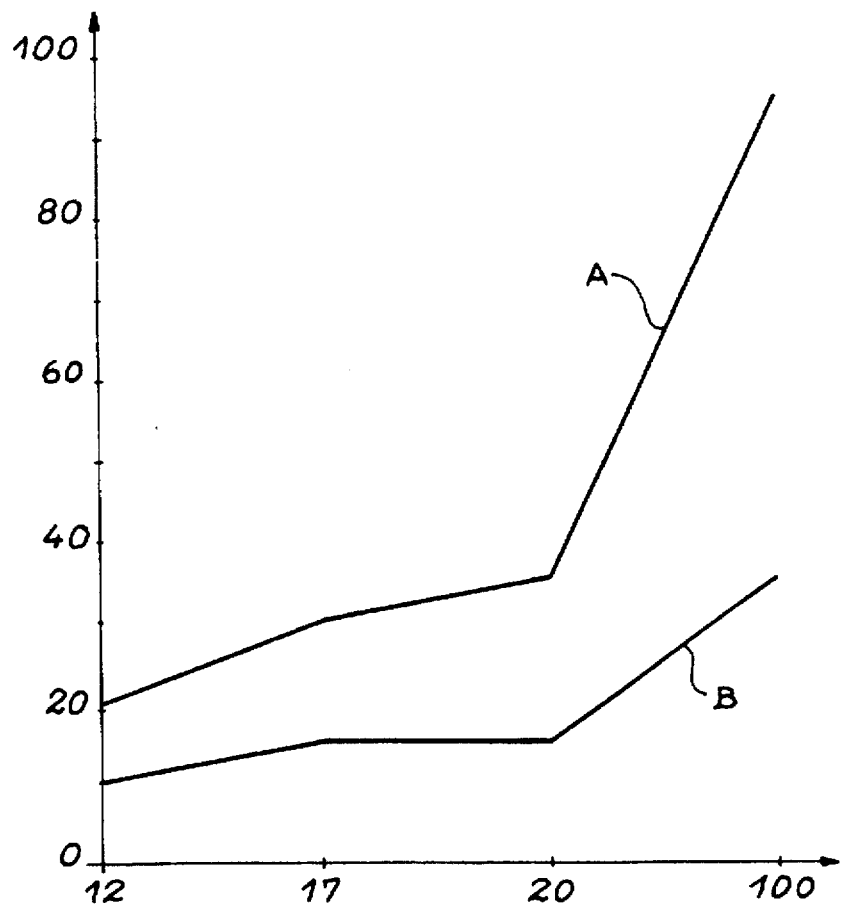
FIG. 8 shows how the contact impedance of a CW(Co) coating varies as a function of cobalt percentage, at two different frequencies.

FIG. 8 shows how contact impedance varies at two different frequencies (curve A=10 Hz, curve B=100 Hz) as a function of cobalt percentage in the tungsten carbide. This figure shows the advantage of working preferably with less than 20% by weight of cobalt.

Contact impedance is the same for identical doping percentage, regardless of whether the doping uses cobalt or nickel.

In addition, the CW(NiCrMo) coating has the lowest contact impedance above 10 Hz.

Given all the properties as described above, it is thus clear that:

combining the selected coatings and substrates does indeed satisfy the requirements that may be necessary for use in boreholes, in which thermal, chemical, and mechanical stresses can be considerable; and the person skilled in the art can choose coatings that are appropriate as a function of said thermal, chemical, or mechanical stresses, or can implement other tests necessary for making this choice. Similarly, it is possible to select a coating in order to obtain a given value of contact impedance at a given frequency.

Deposition techniques for forming the various layers of material are described below.

A first technique is chemical vapor deposition (CVD). It also covers variants thereof such as plasma-enhanced chemical vapor deposition (PECVD), low pressure chemical vapor deposition (LPCVD), photo-assisted chemical vapor deposition (PCVD) and laser-assisted chemical vapor deposition (LCVD). The advantage of this technique lies in the possibility of producing layers that are uniform, compact, and that bond very strongly. At low temperature and at high concentration, it is possible to produce coatings that are fine or amorphous. The disadvantage of this technique is the need to operate at high temperature (700° C.–1000° C.) which can give rise to damage to the substrate or which can cause undesirable mechanical properties to be developed therein.

Another technique is physical vapor deposition (PVD). This technique implements the following steps:

transformation of the coating material into the gaseous state;

transport of the resulting vapor to the substrate; and condensation of the vapor on the surface of the substrate to form the deposit.

Hybrid methods, combining chemical and physical methods of forming the solid deposit may also be used in order to prepare coatings that are hard and withstand wear, such as the coatings described above.

Another method is laser deposition. This method uses a laser beam which provides the activation energy required for a chemical reaction. A laser beam can also be used in combination with the CVD method, to provide an external energy source. It is then possible to deposit fine structures with great accuracy.

Another method is the sol-gel method. In this method, a solution of the elements that are to be deposited is formed in an organic solvent, and the solution is then polymerized to form a gel which is applied in the desired shape on the substrate. The gel is finally dried and baked to eliminate the organic solvent, thereby forming the desired final solid phase.

Another technique is ion implantation. This technique which is extremely effective for treating surfaces makes use of high energy ions to modify the properties or the composition of a surface. The ions from a given ion source are accelerated (with a voltage of 10 kV to 100 kV) and they bombard a target which may be rotated in order to obtain a coating that is uniform. Deposits are thus obtained that bond strongly to the substrate and that are coherent.

Finally, it is possible to use the plasma spray technique with the help of a plasma torch. This technique has the following advantages:

low cost compared with the techniques mentioned above;

very good reproducibility;

very good control over firing parameters; and greater speed than the above techniques (about 15 minutes per deposit).

In this technique, the material that is to be deposited is melted and the resulting droplets are sprayed against the substrate at high speed (about 300 meters per second (m/s)). The substrate is generally kept at a temperature below 150° C. It is thus possible to obtain coatings on substrates that have a low melting temperature (aluminum alloy, stainless steel, plastics). In contrast, the temperature at the outlet from the plasma torch is extremely high (typically 7,000° C. to 10,000° C.), which means that it is necessary to use powders that have high melting points. The plasma is formed using a gas such as argon, helium, nitrogen, or oxygen, or mixtures thereof. The advantage of argon is that it is easily ionized and it makes it possible to produce a plasma that is more stable at torch operating voltages of about 70 volts. The grains of material that are injected at the end of the torch melt into droplets which, on impact against the substrate, take up the shape of disks or platelets. The impact is exothermal. The density of the deposited layer increases with the fluidity of the droplets and with their impact speed. In this technique, high quality films of metals or alloys can be deposited quickly and at very low cost. This method is particularly well adapted to depositing the hard materials concerned by the present invention, whether they are insulating or electrically conductive. The equipment described in patent application EP-A-0 580 097 published on Jan. 26, 1994 can be used for implementing the method.

In general, the manufacture of a sensor of the invention will make use, for example, of various different plasma spraying steps for materials that are hard and insulating and for materials that are hard and conductive, e.g. onto a support or substrate that is in the form of a sector of a cylinder. Predetermined patterns in the distribution of the conductive portions and the insulating portions can be achieved by successive masks, e.g. using masks made of metal.

Manufacturing details for a sensor element such as that shown in FIGS. 4a and 4b are described below with reference to FIGS. 9a to 9d. References identical to those of FIGS. 4a and 4b are used therein to designate the same elements.

The first step consists in choosing an appropriate substrate, in this case a half-tube 34 of a stainless steel that is poorly magnetizable, e.g. 316-L type stainless steel. The substrate is machined so as to be capable of receiving the desired through connection 58 (through connections are described in detail below). It is degreased using trichloroethylene vapor and it is then subjected to conundrum blasting (30 grade) at a pressure of 2 bars.

In a second step, a bonding layer 45 of NiCrAlY is deposited to a thickness of about 50 μm by plasma spraying.

Figure 9A:
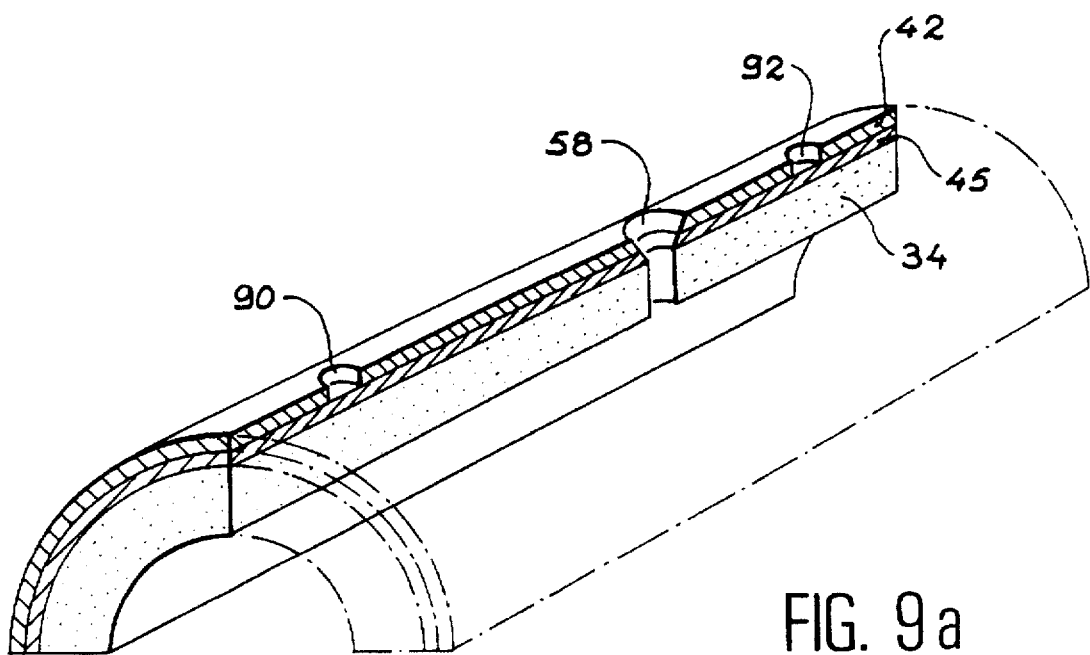
Figure 9D:
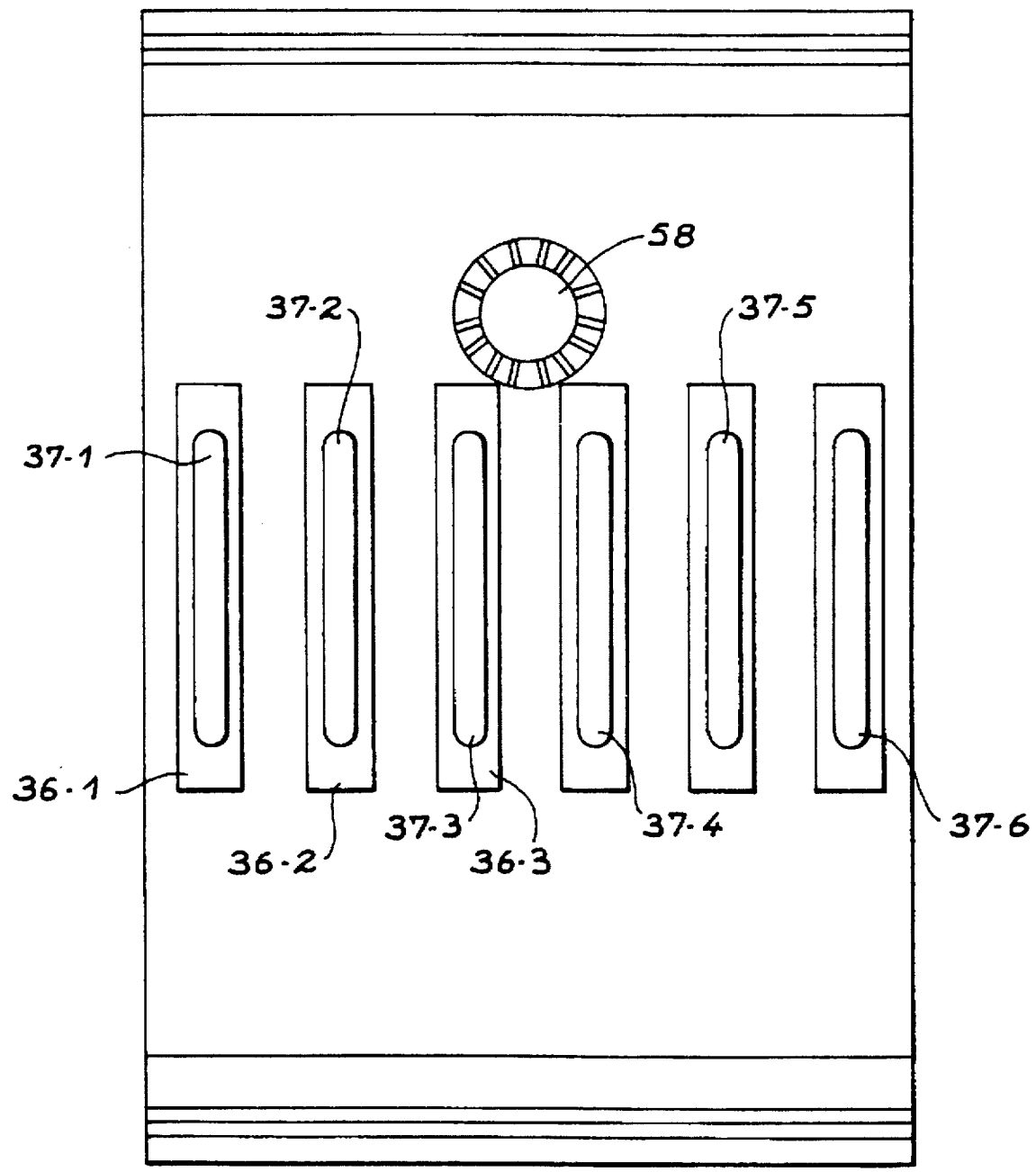

In a third stage, plasma spraying is used to deposit a layer 42 of $Al_2O_3$—$_{TiO2}$ (97%–3%) to a thickness of about 250 μm over the entire part except in the two zones for grounding electrodes (FIG. 9a, references 90 and 92).

Thereafter, in a fourth step (FIG. 9b), a metal mask with cutouts is put into place to enable the "printed circuit" that forms the electrical link means 48-1, . . . , 48-6, 54-1, . . . , 54-6, 49, and 51 to be sprayed. The printed circuit which is made of nickel (or copper or aluminum) is sprayed to a thickness of about 150 μm. Each of the two ends 46-1, . . . , 46-6, 50-1, . . . , 50-6, 52-1, . . . , 52-6, 56-1, . . . , 56-6 of each printed circuit element is then masked (see FIG. 9c) and a layer of $Al_2O_3$—$TiO_2$ is sprayed to a thickness of 400 μm.

Thereafter, the surface is masked in part so as to spray on the electrodes of tungsten carbide (CW) 17% doped with Co, to a thickness of about 200 μm. These electrodes are referenced 37-1, . . . , 37-6 and 36-1, . . . , 36-6 in FIG. 9d.

Thereafter the center of each end of the printed circuit is grooved adjacent to the through connection 58 over a width of 0.2 mm. The nickel or copper wires having a diameter of 0.2 mm are then mounted in the grooves. The gaps between the through connections are masked.

Thereafter the wires are stuck to the through connection by spraying on nickel to a thickness of about 150 µm. The through connection zones are then insulated by spraying on $Al_2O_3$ to a thickness of about 300 µm.

A final treatment serves to reduce the porosity of the outermost layers. This treatment may consist in:

- surface melting of the outer layer by means of a torch or a laser;
- in the conductive zones, applying a covering of cobalt, of nickel, or of aluminum after the layer itself has been deposited; and
- in the insulating zones, applying a covering of phenol resin in a vacuum, after applying high pressure (1450 bars) in water or in any other inert liquid to break the walls between the grains that should withstand a pressure of not more than 1450 bars.

In the above method, all of the layers are deposited by plasma spraying using a plasma torch, and at each step, it is possible to monitor the appearance and the thickness of the deposits being made. Similarly, it is easy to monitor the insulation (or conductivity as the case may be) of the deposited insulating layers (or conductive layers).

This method makes use of conventional masking techniques as used in the printed circuit field, in association with the plasma spraying technique which is, itself, well mastered and cheap. For masking purposes, it is also possible to use "silkscreen" type techniques, where the mask is constituted by a substance that adheres to the substrate, and that is removed after spraying. It is thus possible to provide a sensor that is easy to manufacture, low in cost, and easily reproducible. In addition, as already mentioned above, it is possible to adapt the nature of the deposits to the nature of the formations and of the fluids with which the device is to come into contact.

The method of manufacture is described above in the context of making a sensor of the kind shown in FIGS. 4a and 4b. However, it is clear that it is possible to make conductive zones having any desired shape; this can be done merely by adapting the shape of the masks during the method of manufacture. Thus, it is quite possible to make a measurement device whose structure is as shown in FIGS. 1a and 1b, i.e. having a relatively large central guard electrode 10, generally circular current injection measurement electrodes 16, 18, 20, and 22 placed on the central axis, and also focusing electrodes 12 and 14.

The method as described above enables layers to be deposited in uniform manner on a surface that is itself uniform and that has previously been cleaned or degreased.

When the particles constituting the coating 42 are sprayed onto the substrate (e.g. by plasma spraying), bonding is essentially mechanical, the particles literally called "hooking" themselves onto the roughnesses of the spray-receiving surface. Consequently, prior to deposition of the bonding layer, the substrate may advantageously be toughened by sand blasting.

Figure 10A:
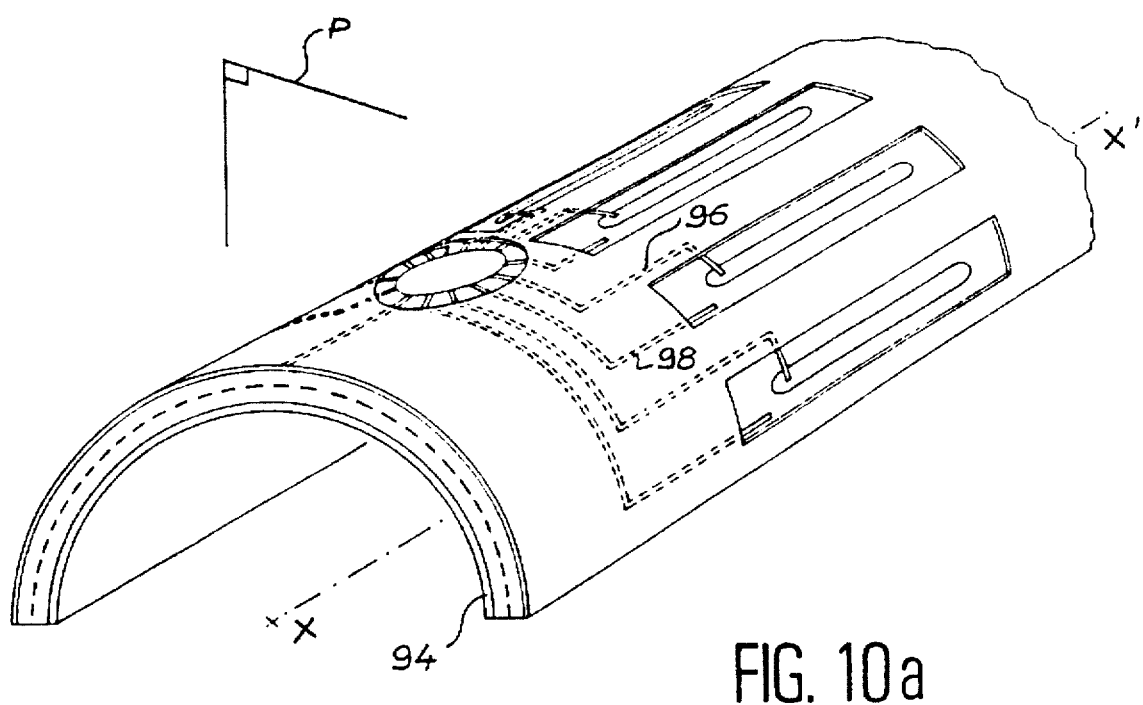
FIGS. 10a to 10e show steps in another method of manufacturing a sensor of the invention.
Figure 10B:
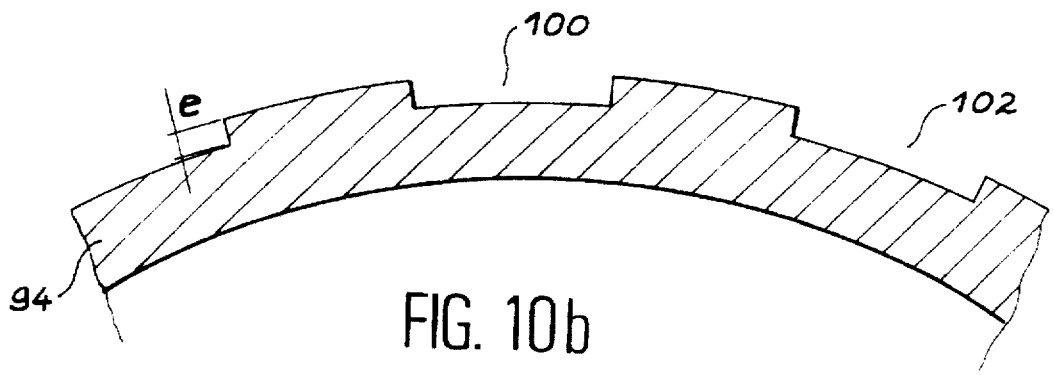
Figure 10C:
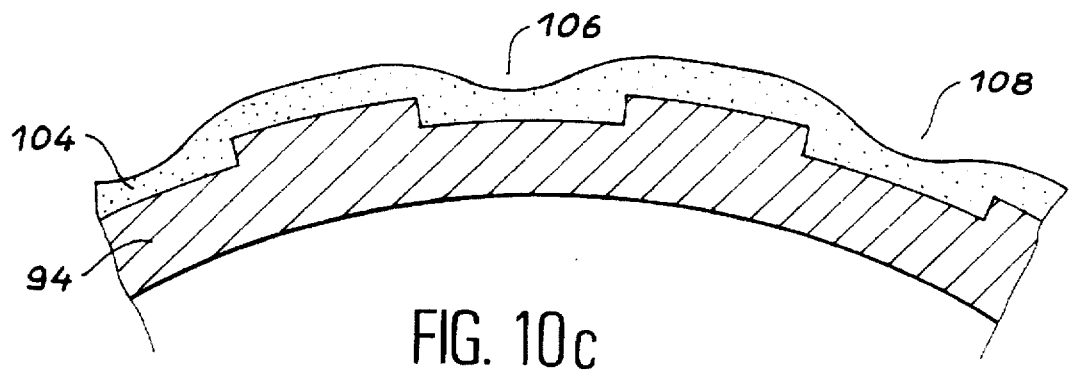
Figure 10D:
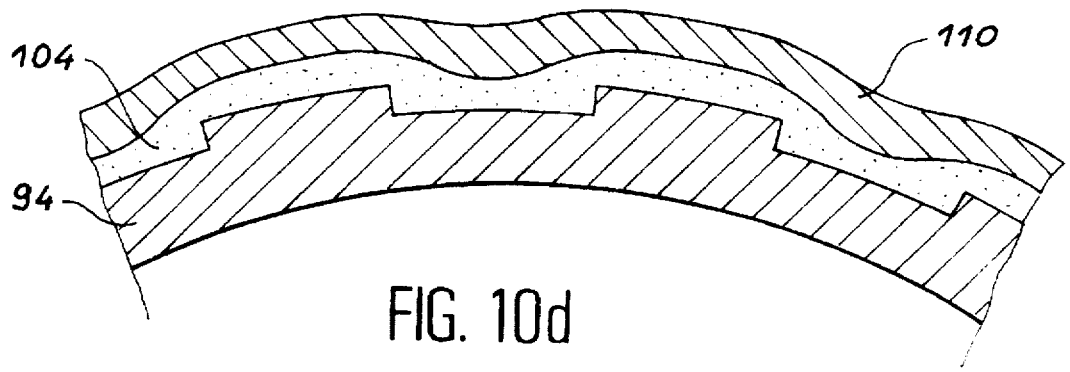
Figure 10E:
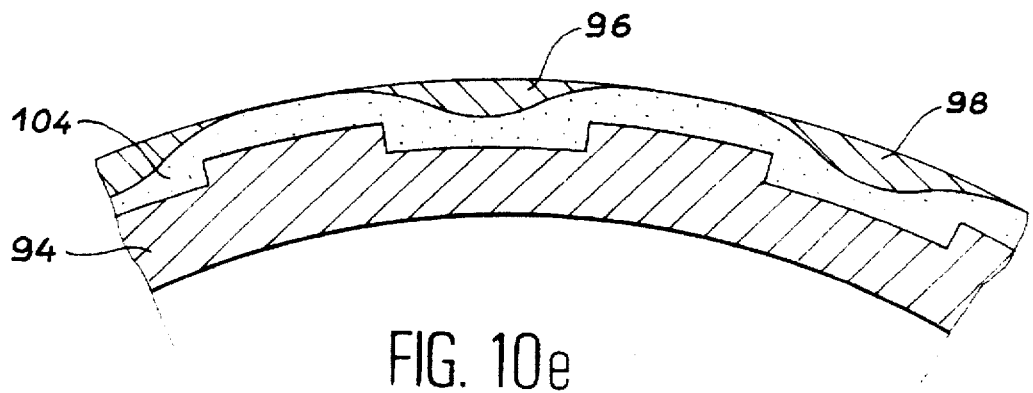

Another method of manufacture is described below with reference to FIGS. 10a to 10e. FIG. 10a is a perspective view of a half-cylinder 94 which is used as the substrate for the various deposits (deposit of insulating material, deposit of conducting material, connection tracks). Before performing any deposition, the substrate 94 is etched, e.g. to have the shapes which it is desired to impart to the conductive zones and/or to the connection tracks. Thus, FIG. 10b shows a portion of the section of the substrate on plane P of FIG. 10a, which portion is to have the tracks 96 and 98 deposited therein, FIG. 10b being prior to any deposition. References 100 and 102 designate etched zones that extend parallel to the axis XX' of the cylinder. Etching may be to a depth e lying in the range a few tens of micrometers to a few hundreds of micrometers. In a second step (FIG. 10c), a first layer 104 is deposited (e.g. a layer of hard insulating material such as an $Al_2O_3$—$TiO_2$ mixture). This deposition can be performed by any one of the techniques mentioned above, and is preferably performed by plasma spraying. It is thus possible to deposit a layer 104 whose thickness lies in the range a few tens of micrometers to a few hundreds of micrometers. The outside surface of this layer 104 is undulating, having valleys 106 and 108 in alignment with the etched zones 100 and 102. Prior to depositing the layer 104, it is also possible to deposit a layer of bonding material as described above. During the next step (FIG. 10d), a layer 110 is deposited of a material that is hard and electrically conductive, e.g. cobalt-doped tungsten carbide. This layer 110 is also shaped in a manner that corresponds to the etched zones 100 and 102. As shown in FIG. 10e, the next step consists in rectifying the assembly so as to allow the conductive zones 96 and 98 to remain only in the valleys 106 and 108 defined by the layer 104. Thereafter, it is naturally possible to deposit a uniform layer of material that is hard and electrically insulating over the entire assembly. The above-described variant method of making the conductive connection tracks can be adapted to making conductive zones similar to the zones 36-1, ..., 36-6, 37-1, ..., 37-6 in FIG. 4a. It can easily be combined with the technique of selective deposition using masks, as described above.

The various sensors and methods of manufacturing them as described above thus present numerous advantages over devices and methods of the prior art. The coatings enable the entire device to have great mechanical strength imparted thereto, and in particular there is no longer any risk of unseating as in the case shown in FIG. 1b. The chosen coatings have good chemical resistance and it is possible to modulate the contact impedance as a function of the deposits made. The methods described are easy to implement, and they are easy to modulate (if the plasma spraying technique is being used, it is possible to vary the composition of the deposited layers by appropriate mixing of the powders that are being sprayed). Finally, the resulting device presents far fewer different components since the prior art device requires, as already explained in the introduction, electrodes, a rubber coating, and wire connections. In this case, all of those elements have been replaced by layers that can be deposited on the substrate using a single technique.

Figure 11:
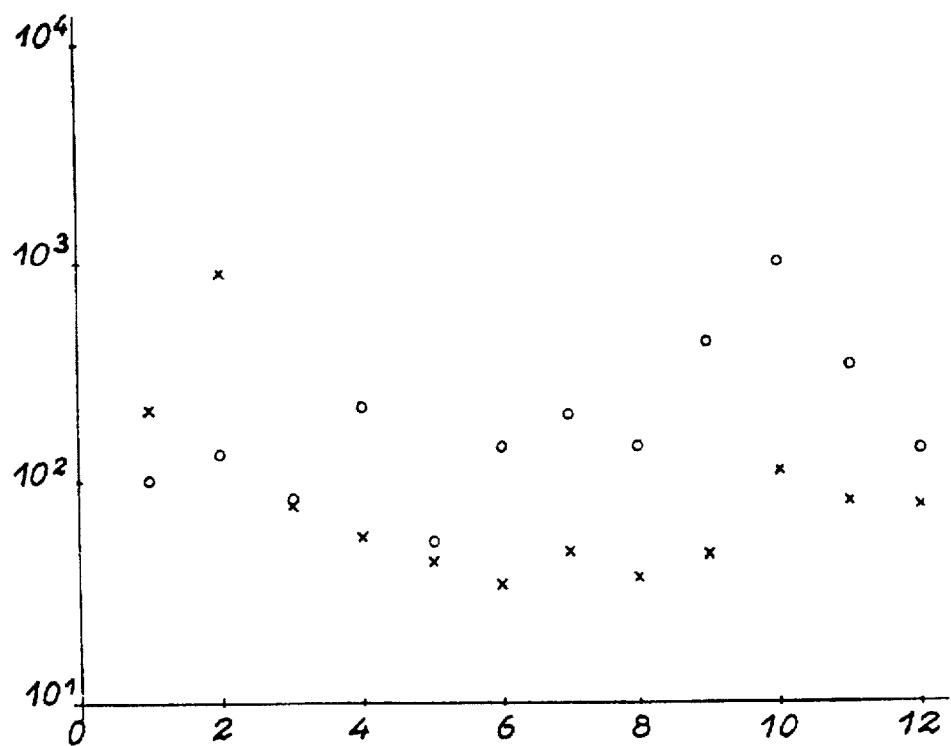
FIG. 11 compares the noise obtained with a device of the present invention and with a prior art sensor.

Finally, it has been observed that with a device of the present invention, it is possible to take measurements having a much better signal-to-noise ratio than with prior art sensors. In particular, spike type interference is much smaller on the conductivity logs obtained using a sensor of the invention. That must doubtless be attributed to the fact that the deposited layers of hard material that is insulating or conductive provide far less opportunity for catching particles or lumps of matter from the formations being logged than do the surfaces of the stainless steel electrodes used in the prior art. On this topic, a comparable example is given in FIG. 11. This figure shows measurements performed firstly with a prior art sensor, of the configuration shown in FIG. 4a, and secondly with a sensor of the present invention, e.g. the sensor shown in FIGS. 4a and 4b and making use of ceramic deposits. For each of the electrodes (there are twelve around each sensor, six on each half-shell as shown in FIG. 4b) the signal is recorded, and processed, and it is possible to deduce therefrom an estimate of the noise that has been added to the signal. Two sensors were used under the same conditions in the same borehole over the same range of depth (1310 m to 1240 m). FIG. 11 shows the noise value for each channel of the prior art electrode (points marked by crosses in FIG. 11), and the noise level for each channel of the device of the present invention (marked by circles in FIG. 11). It can be seen that for most of the electrodes, the noise value is smaller for the sensor of the invention than for the sensor of the prior art. With the invention, it has been possible to improve the signal-to-noise ratio by a factor of four.

Figure 2:
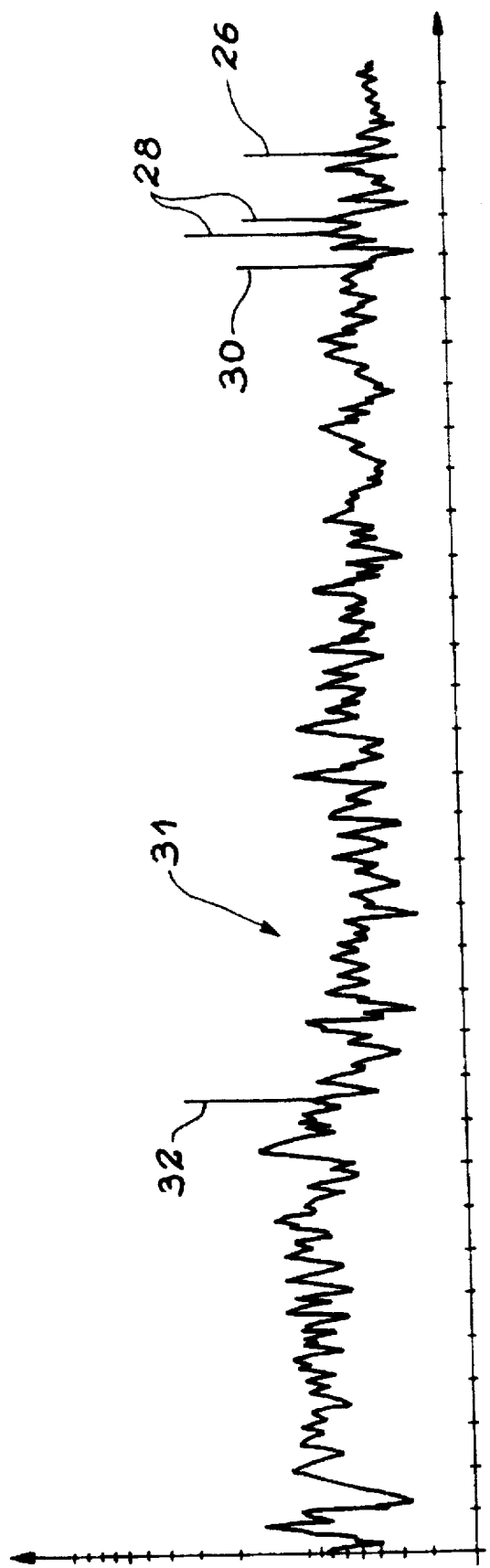
FIG. 2 shows an example of a resistivity log obtained using a prior art sensor.
Figure 3A:
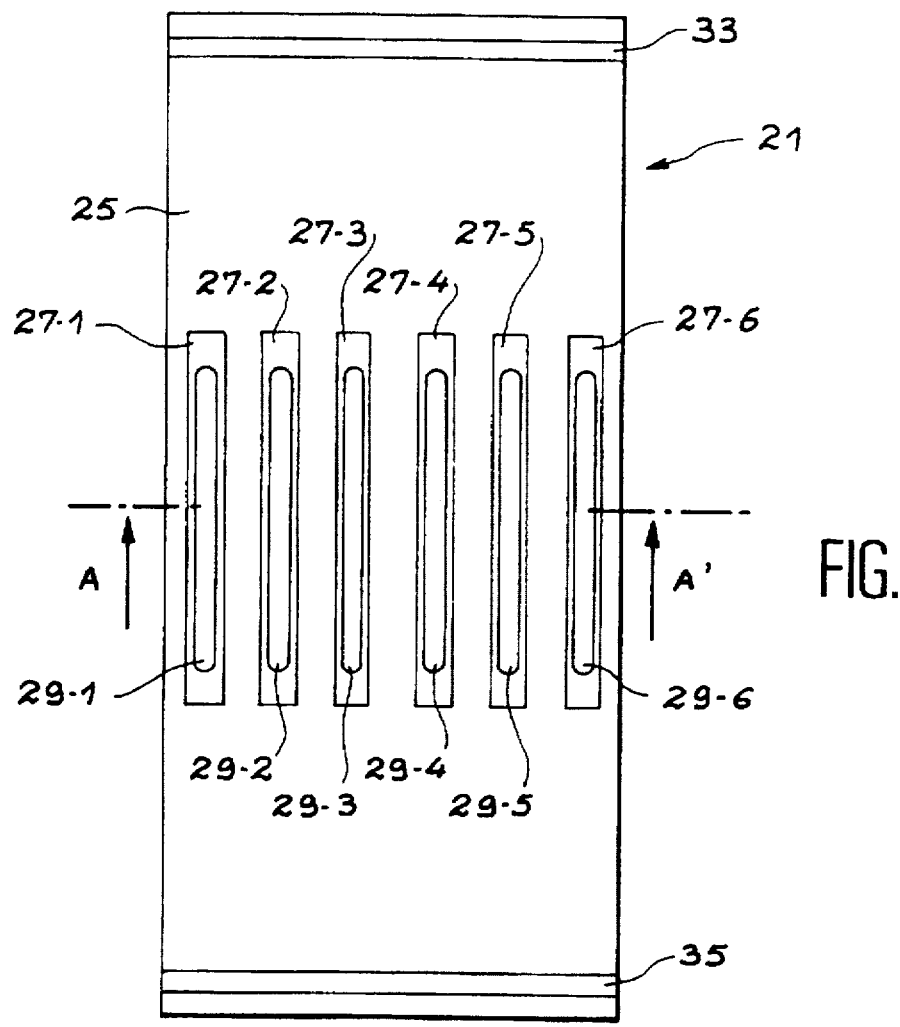
FIGS. 3a and 3b show another prior art measurement sensor.
Figure 3B:
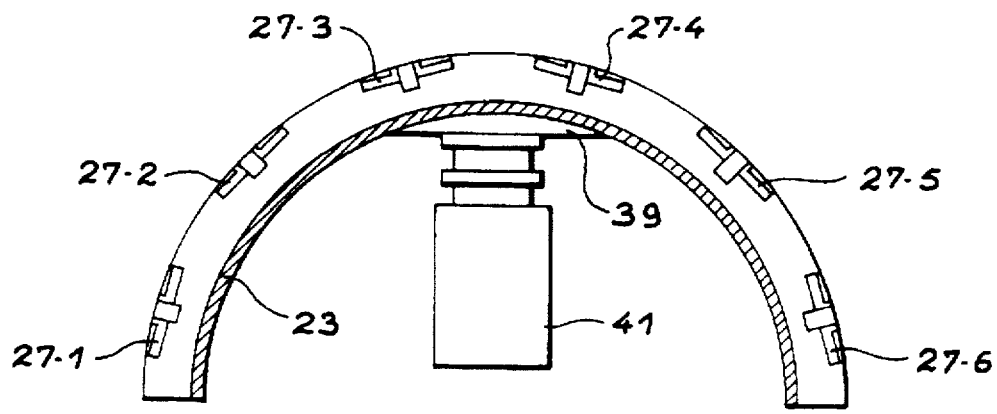

The sensor of the invention as described above can be used in combination with a through connection of the prior art. One such through connection is shown diagrammatically in FIG. 3b, where reference 39 designates a metal base welded against the inside face of the substrate 23, said metal base generally being embedded in a rubber molding (not shown in FIG. 3b); it is extended by a connector 41 of stainless steel. To use this type of through connection in combination with the present invention, it suffices to extend the conductive tracks such as the tracks 48-1, ..., 48-6, 54-1, ..., 54-6 (see FIG. 4b) and the corresponding tabs 50-1, ..., 50-6, 56-1, ..., 56-6 by wires that pass through the substrate via holes previously provided for this purpose, the wires then being covered in a layer of material that is hard and insulating, e.g. $Al_2O_3$—$TiO_2$ in accordance with the present invention. This type of through connection gives rise to problems since it requires a welding step and a robber molding step on the inside face of the substrate that carries the electrodes of the sensor.

Figure 12:
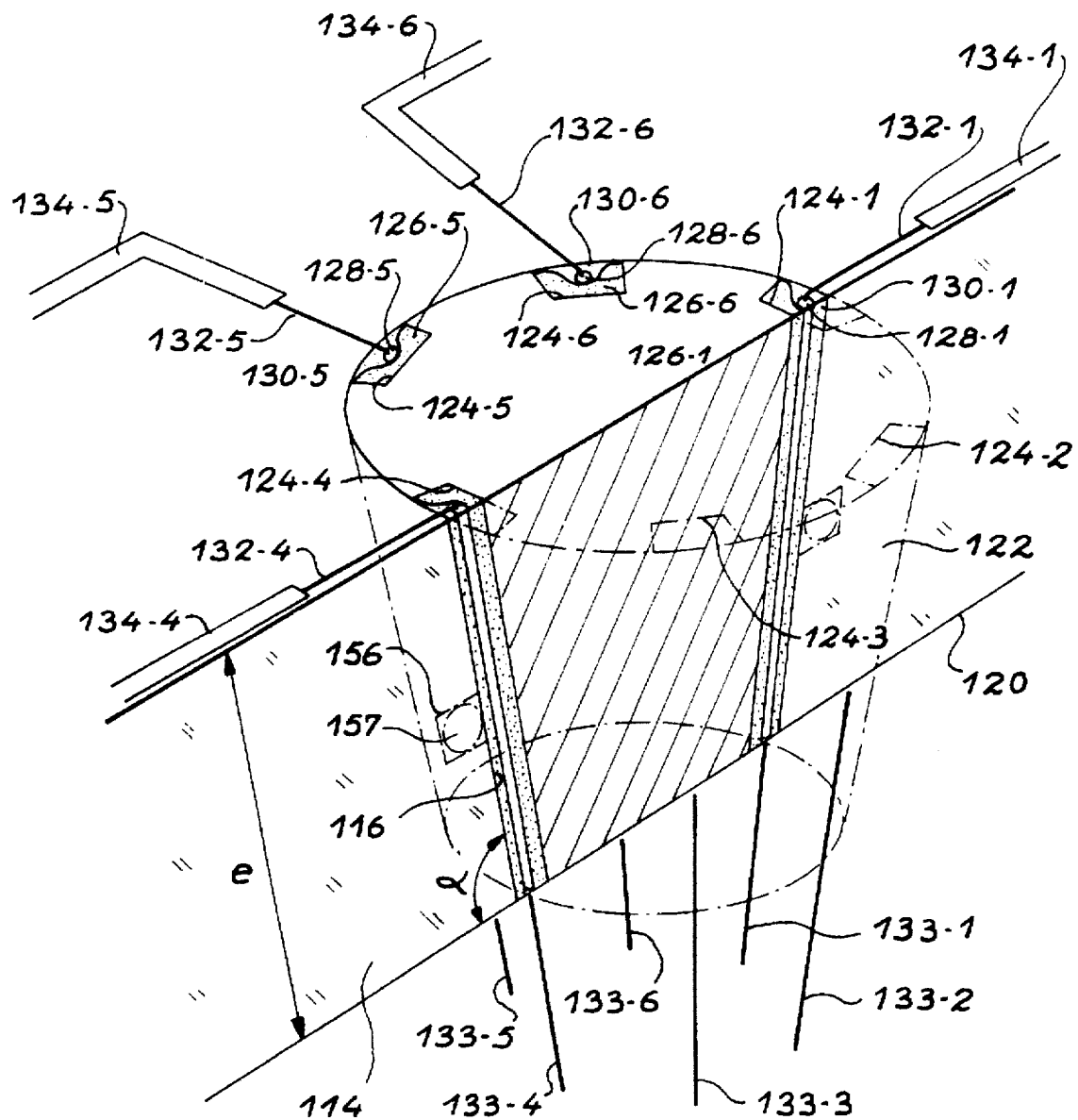
FIG. 12 shows a through connection used with a sensor of the present invention.
Figure 13:
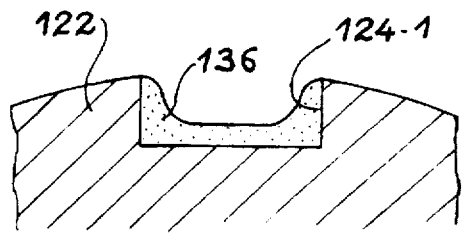
FIGS. 13a to 13d, 14a, 14b and 15 show various methods of making a through connection.
Figure 13:
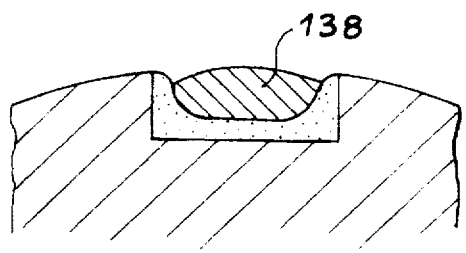
Figure 13:
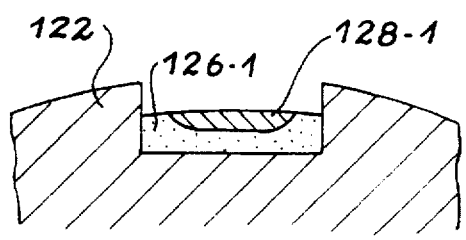
Figure 13:
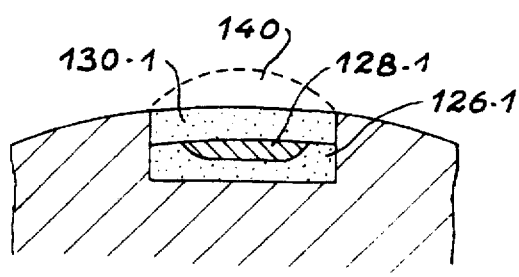
Figure 14:
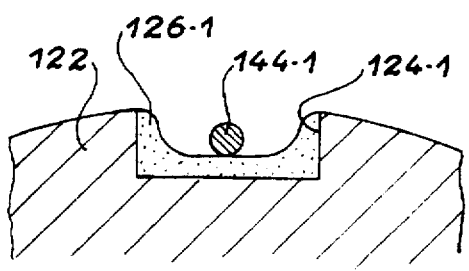
Figure 14:
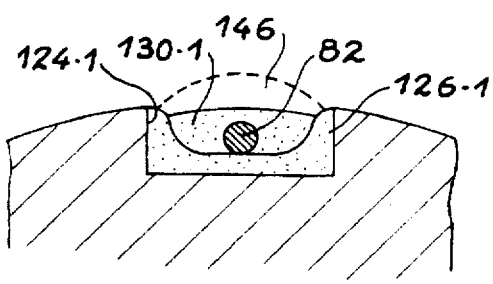

A new type of through connection suitable for use in combination with the present invention is described with reference to FIGS. 12 to 14. FIG. 12 is a perspective view of a support 114 on which layers of conductive material forming the electrodes and the conductive tracks are to be deposited, the section passing through the through connection that is referenced 118. The substrate 114 of thickness e must initially be milled to form a hole 116 in the form of a truncated cone. Relative to the inside surface 120 of the support, the walls of the truncated cone form an angle $\alpha$. The through connection is essentially constituted by a truncated cone 122 of height h which is greater than or equal to the thickness e of the substrate 114 and which has an angle at the apex that is substantially equal to $2\alpha$. The cone is initially machined so as to present N grooves around its periphery (in FIG. 12, N=6 grooves are shown; it is possible for N to be a number other than 6, e.g. N=12). In FIG. 12, these grooves are given the following references: 124-1, 124-2, 124-3, 124-4, 124-5, and 124-6. When the cone 122 is made of a metal, e.g. 316-L stainless steel, each groove 124-n (n=1, ..., 6) is filled by an assembly comprising a first layer 126-n of insulating material, a conductive element 128-n, and a second layer 130-n of insulating material. Conductive wires 132-n and 133-n are brazed to the conductive elements 128-n at each end of the truncated cone. As shown in FIG. 12, when the through connection 118 is inserted in the substrate 114, the conductor wires 132-n serve to provide electrical connection with the conductive tracks 134-1, ..., 134-6 deposited on the outside surface of the substrate 114 (here again only six conductive tracks are mentioned; it will be quite possible to use 12 or 24 conductive tracks, as in FIGS. 4a or 4b). The connections 133-n serve to provide respective electrical links with the power supplies or the measurement apparatuses that are contained in the logging string having the device situated at its end.

FIGS. 13a to 13d show the steps in a method of depositing the set of elements 126-1, 128-1, and 130-1 in a groove 124-1. In a first step (FIG. 13a) a layer 136 of insulating material is deposited on the bottom and on the sides of the groove 124-1. Naturally, it is advantageous to perform this deposition using the same technique as that used for depositing the various layers on the outside of the substrate 114. Thus, if those layers are deposited by plasma spraying, then the layer 136 may be constituted by $Al_2O_3$ deposited by plasma spraying. Insofar as a relatively uniform layer 136 has been deposited on the inside walls of the groove 124-1, the layer 136 retains the shape of a groove and is capable, in a second step (FIG. 13b) of receiving a deposit of a conductive material 138, e.g. by plasma spraying. The third step is a machining step (FIG. 13c) serving to reduce the thickness of the layers of insulator and conductor deposited during the preceding steps to a value that is smaller than the depth of the groove 124-1. This defines the final shape of the element 126-1 situated in the bottom of the groove 124-1 and of the conductive element 128-1. The last layer 140 of insulating material then needs to be deposited (FIG. 13d), preferably using the same technique as that used for depositing the layer 138. A final rectification step serves to bring down the level of said layer 140 to that of the layer 130-1 which is flush with the outside surface of the truncated cone 122. Thereafter, the connection wires 132-1 and 133-1 are fixed, e.g. by brazing. In a variant of the method, shown in FIGS. 14a and 14b, a layer 126-1 of insulating material is deposited so that it matches the shape of the groove. A conductor wire 144-1 is then put into place and covered in a layer 146 of insulating material, after which it is rectified so as to obtain a layer 130-1 that is flush with the outside surface of the truncated cone 122.

It is also possible to deposit a layer of insulating material all round the cone.

Figure 15:
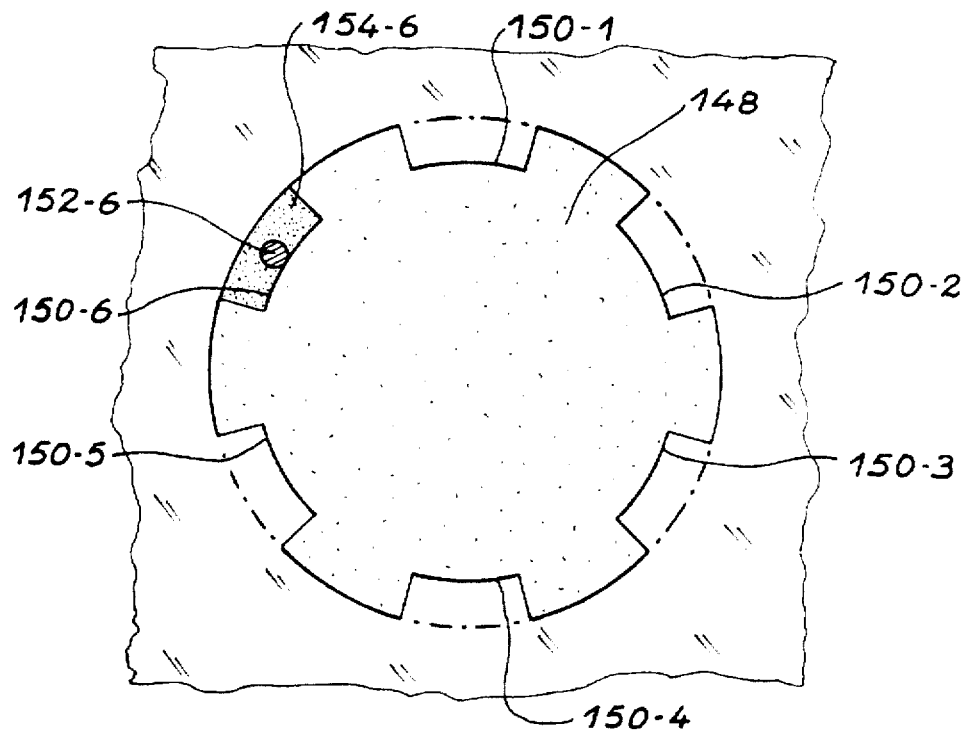

A variant of this type of through connection is shown in FIG. 15 where the truncated cone 148 is seen from above. The truncated cone has exactly the same shape as the cone 122 shown in FIG. 12 and it has grooves 150-1, ..., 150-6. However, it is not made of steel, but of ceramic. It is therefore possible to place a conductive element, e.g. a conductor wire 152-n, directly on the bottom of each groove 150-n without previously depositing a layer of insulating material. Thereafter, the conductive element is covered in a layer 154-n of insulating material whose outside surface can be rectified. The conductor wires 132-n, 133-n can then be brazed to the ends of the conductor wires 154-n.

Whichever of the two above variants is used, this through connection is easier and cheaper to make than are prior art through connections. The steps of welding and of molding in rubber are avoided, and the various deposits made in the grooves can be implemented using the techniques that are described above for making deposits on the outside of the substrate, and in particular the technique of deposition by plasma spraying. Furthermore, this type of through connection provides sealing between the outside and the inside of the substrate, particularly when the angle at the apex $2\alpha$ of the truncated cone 122 lies in the range 15° to 35°. Sealing can be even further improved if, after the various layers have been deposited in the grooves, a layer of copper or of silver is deposited to a thickness of a few micrometers on the outside surface of the truncated cone. It is also possible to provide a circular groove 156 in the frustoconical wall 116 of the substrate 114 (see FIG. 12) for the purpose of receiving an O-ring 157 which is compressed when the outside pressure increases. This type of through connection is thus particularly well adapted to withstanding high pressures (it is recalled that the outside pressure can be greater than 1000 bars under certain conditions).

Figure 16:
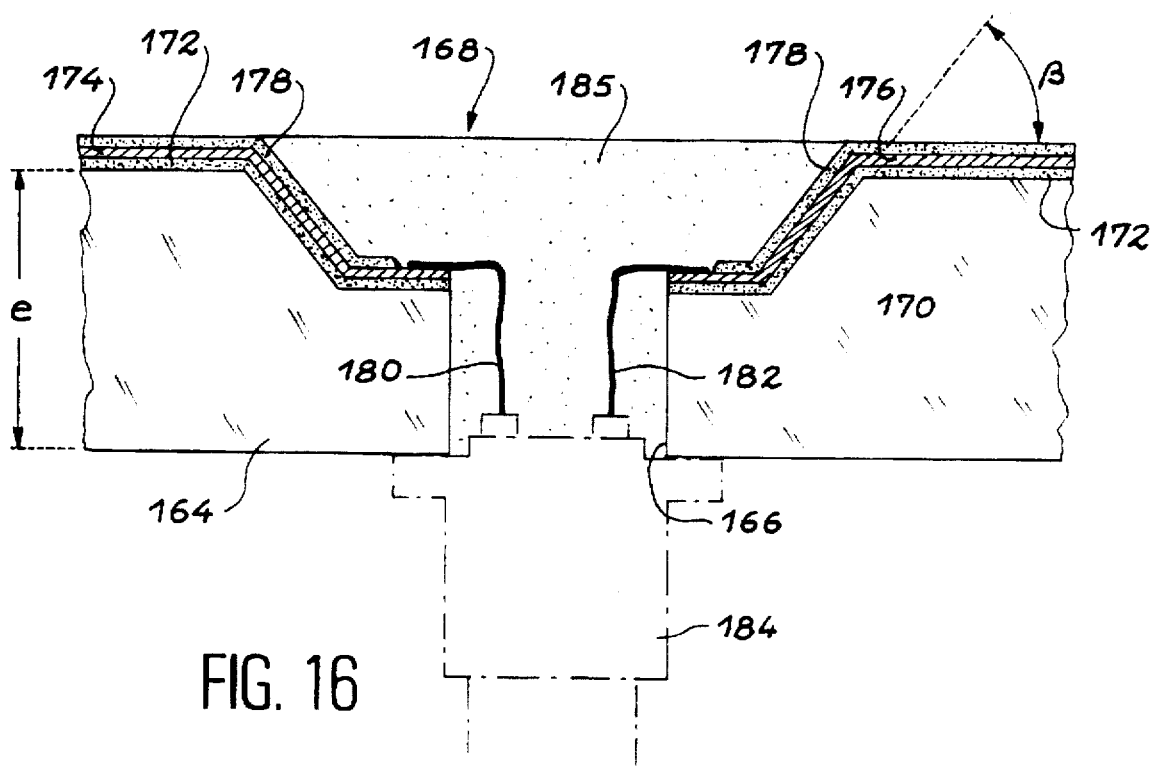
FIGS. 16, 17a and 17b show other through connections that can be used with a sensor of the invention.

Another type of through connection is described below with reference to FIG. 16 which is a side view of a substrate 164 shown in section through the through connection given reference 168. The substrate is initially milled so as to provide an opening having two portions. A first portion 170 is in the form of a truncated cone. Its larger base faces towards the outside surface of the substrate 164 and its walls are inclined at an angle β relative to said outside surface. The truncated cone is continued by a cylindrical opening 166 which constitutes the second portion of the opening. The diameter of the cylindrical opening is less than the diameter of the truncated cone section 170. Various layers are then deposited on the substrate 164, e.g. such as a layer 172 of a material that is hard and insulating, conductive tracks 174, 176, and a layer 178 of a material that is hard and insulating. The various materials constituting these layers, and the methods used for depositing them can be the same as described above. Thereafter, the tracks 174 and 176 are extended by fixing conductor elements 180, 182 to their ends, e.g. by brazing, with the elements being connected at their opposite ends to a connector 184 fixed against the inside face of the substrate 164, e.g. by welding or by bolting. The two openings 170 and 166 are then filled with a resin 185 or with an adhesive that is insulating and not permeable to water. The angle β is preferably chosen to lie in the range 20° to 45°, thereby enabling good sealing and good mechanical resistance to external pressure to be achieved. The angle β is preferably substantially equal to 30°.

Another example of the through connection is described below with reference to FIGS. 17a and 17b. These figures are a section view and a side view of a substrate 194 through its through connection which is referenced 198. The substrate 194 is initially milled so as to provide a circular opening 192 adjacent to its outside surface, which opening is extended inwards by a substantially frustoconical opening 193. A layer 196 of hard and insulating material is then deposited with or without a bonding layer. This insulating layer is extended inside the hole constituted by the openings 192 and 193 all the way to the inside surface of the substrate 194. Conductive tracks 198 and 200 are deposited on this layer and to the outside, and they are connected at their ends closest to the opening 192 to respective conductor wires 202, 204. The wires are brought towards the inside surface of the substrate 194 where they are fixed at their respective ends 206, 208 by means of a layer of insulating material 210, 212 which may be deposited using the same technique as that used for making the deposits on the outside surface of the substrate 194. On the outside, a second layer 214 of hard and insulating material is deposited. Thereafter, the inside of the openings 192, 193 is filled with an epoxy resin 195. Filling is performed in such a manner that the free surface 197 of the resin on the inside of the substrate 194 leaves portions 216, 218 of the conductor wires 202, 204 uncovered in the vicinity of the ends 206, 208 of these wires. These are the portions that serve to provide contacts with a conventional connector applied to the inside surface of the substrate 194 and pressed thereagainst.

Figure 17:
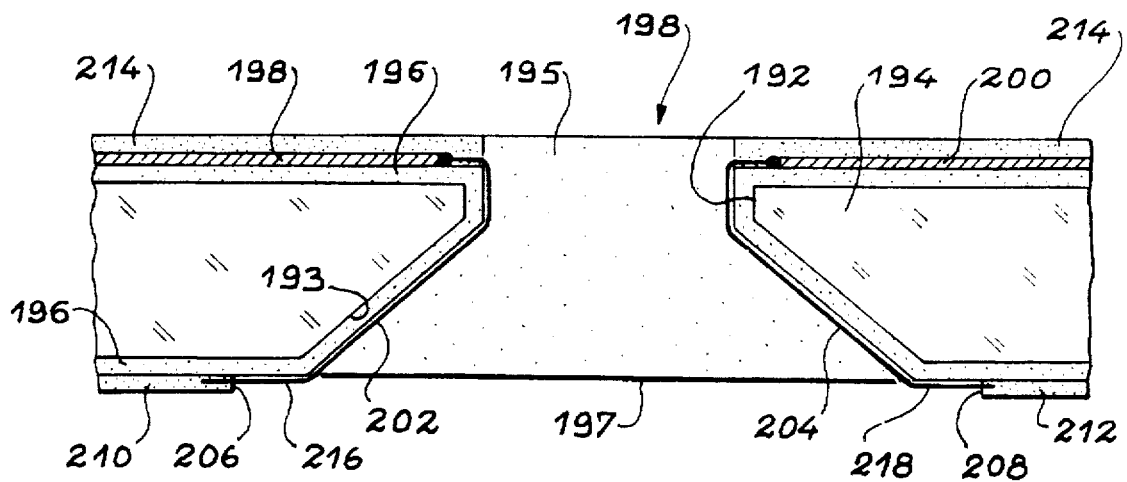
Figure 17:
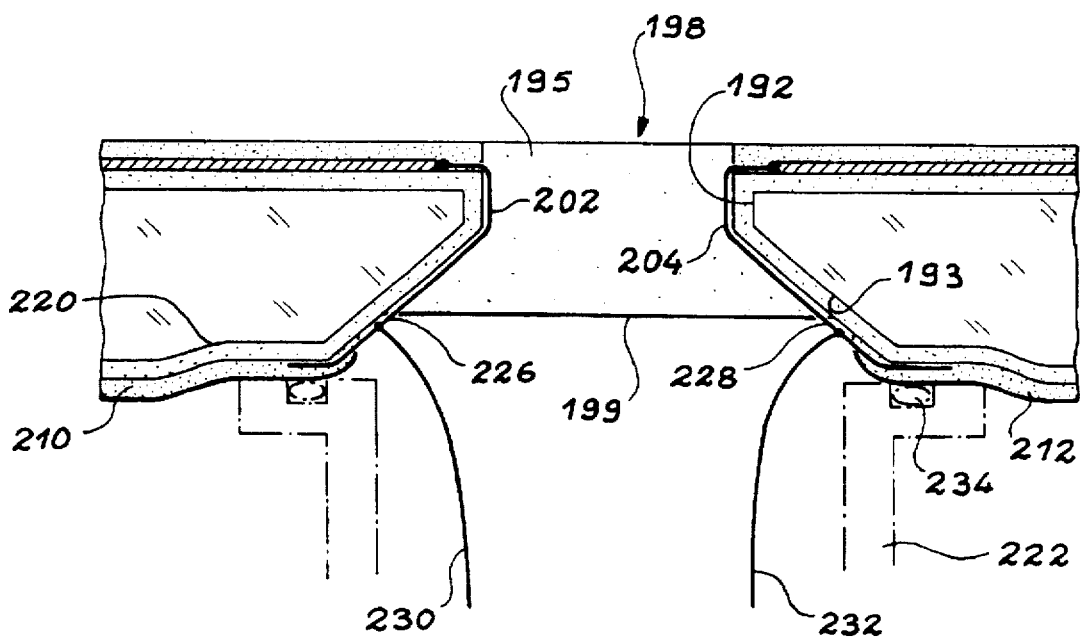

In a particular embodiment, shown in FIG. 17b, after the openings 192 and 193 have been made, the inside surface of the substrate 194 is rectified. This rectified zone 220 must be wide enough to receive a connector 222. The structure of the deposited layers is then identical to that described above with reference to FIG. 17a except that the layers 210, 212 of insulating material are now extended towards the inside of the frustoconical opening 193. The openings 192 and 193 are then filled with resin 195 so that the surface 199 of the resin on the inside of the substrate leaves uncovered portions 226, 228 of the conductors 202, 204 along the sloping wall of the frustoconical opening 193. Contact with the wires 230, 232 of the connector 222 is provided via these portions 226, 228. The connector may be pressed against the rectified zone 220 of the inside surface of the substrate 194 by being bolted or clamped against said surface. An O-ring 234 may be provided to ensure sealing when the connector 222 is put into place against the rectified zone 220.

The various through connections described above are cheap and easy to make. They are made essentially by using deposition techniques that are already being used for the outside layers, possibly together with a filling step using a resin or an adhesive, which does not present any particular difficulty. In addition, this type of through connection makes it possible to minimize the lengths of the electrical wires used and makes it possible to achieve good sealing.

The resin may be such as to compress under pressure while still ensuring sealing and insulation.

In a variant of the devices shown in FIGS. 17a and 17b, the openings 192 and 193 may be of very small diameter, being just large enough to pass through the conductors 202, 204. The conductor wires then extend along the inside surface of the substrate 154, e.g. in the form of electrical links which are deposited using the same techniques as are used for the electrical links situated on the outside surface of the substrate, thereby serving to reach a connector such as the connector 222 of FIG. 17b.

I claim:

1. A sensor element adapted for use in a borehole, having an outside surface adapted for contact with the borehole wall, comprising conductive and insulating portions arranged in a predetermined pattern on a substrate, said conductive and insulating portions being made of hard materials which are respectively electrically conductive and electrically insulating, each of said conductive and insulating portions being formed by layer deposition of, respectively, said conductive and insulating hard materials on said substrate.

2. A sensor element according to claim 1, in which said substrate is a metal substrate.

3. An electrical measurement sensor adapted for use in a borehole by contact with the borehole wall, comprising:

a metal support having an outside surface and an inside surface;

a first layer of a material that is hard and electrically insulating deposited on the outside surface of the support;

a layer of a material that is hard and electrically conductive deposited on a portion of the first layer and defining one or more electrodes;

at least one electrical through connection disposed inside or against the inside surface of the metal support;

electrical link elements deposited on the first layer, each having a first end connected to an electrode and a second end connected to one of the through connections; and a second layer of a material that is hard and electrically insulating, covering at least some of the electrical link elements.

4. A sensor according to claim 3, further including a layer of bonding material for the first layer of material that is hard and insulating, the bonding material lying between said first layer and the metal support.

5. A sensor according to claim 3, in which the bonding layer is represented by the formula MCrAlY where M is selected from the group consisting of a metal, NiAl, and molybdenum.

6. A sensor according to claim 3, in which the material that is hard and insulating is selected from the group of oxides consisting of: $Al_2O_3$, $TiO_2$, $SiO_2$, $Cr_2O_3$, $ZrO_2$, $Y_2O_3$, and $B_2O_3$.

7. A sensor according to claim 3, in which the material that is hard and conductive is of the carbide type.

8. A sensor according to claim 7, in which the material that is hard and conductive is constituted by a base material selected from the group consisting of $B_4C$, SiC, $Be_2C$, TiC, WC, TaC, NbC, $Cr_3C_2$, $b-MO_2C$, h-MOC, VC, HfC, and ZrC, said material being doped with a dopant selected from a material selected from the group consisting of cobalt, nickel, and a ternary nickel-chromium-molybdenum (NiCrMo) mixture.

9. A sensor according to claim 8, in which the dopant fraction is less than 20% by weight.

10. A sensor according to claim 3, in which the electric link elements are conductive tracks.

11. A sensor according to claim 3, in which the support includes a hole in the form of a truncated cone at the location of at least one electrical through connection, the walls of the truncated cone forming an angle $\alpha$ with the inside surface of the support.

12. A sensor according to claim 11, in which the through connection includes a truncated cone of metal having grooves in its periphery, each groove being filled by an assembly comprising a first layer of an insulating material, a conductor element, and a second layer of an insulating material.

13. A sensor according to claim 11, in which the through connection comprises a truncated cone made of ceramic and having grooves in its periphery, each groove being filled by an assembly comprising a conductor element and a layer of insulating material.

14. A sensor according to claim 12, in which the angle at the apex $2\alpha$ of the truncated cone lies in the range 15° to 35°.

15. A sensor according to claim 12, in which the truncated cone has coated thereon a metal layer to a thickness of a few micrometers, further wherein the metal is selected from the group of metals consisting of copper and silver.

16. A sensor according to claim 3, in which the support includes an opening constituted by a first portion and by a second portion, the first portion being in the form of a truncated cone whose walls slope at an angle $\beta$ relative to the outside surface of the support, and the second portion being in the form of a cylinder that opens out in the inside surface of the support.

17. A sensor according to claim 16, in which a groove is formed in the wall of the hole that is in the form of a truncated cone, said groove being adapted to receive an O-ring.

18. A sensor according to claim 16, in which the electrical link elements deposited on the support are extended by first conductor elements passing through the second portion of the opening and enabling them to be connected to electrical connector means situated inside the support, the first and second portions of the opening being filled with a filler selected from the group consisting of an epoxy resin and an adhesive.

19. A sensor according to claim 18, in which angle $\beta$ lies in the range 20° to 45°.

20. A sensor according to claim 19, in which angle $\beta$ is substantially equal to 30°.

21. A sensor according to claim 3, in which the support includes a circular opening that is extended towards the inside via an opening that is substantially frustoconical in shape.

22. A sensor according to claim 21, wherein the first layer of material that is hard and insulating is extended over the walls of the openings and also over a portion of the inside surface of the support.

23. A sensor according to claim 22, in which the electrical link elements deposited on the support are extended by conductor elements brought out towards the inside surface of the support, against which surface they are held fixed by a layer of insulating material, the openings being filled with a filler selected from the group consisting of an epoxy resin and an adhesive, thereby leaving portions of the conductor elements free adjacent to the inside surface of the support.

24. A sensor according to claim 22, wherein the electrical link elements deposited on the support are extended by conductor elements brought out via the openings towards the inside surface of the support against which they are held fixed by a layer of insulating material extending over a portion of the frustoconical opening, the openings being filled with a filler selected from the group consisting of an epoxy resin and an adhesive in such a manner as to leave portions of the conductor elements free along the wall of the frustoconical opening.

25. A method of measuring the resistivity of formations traversed by a borehole, comprising the step of displacing along the borehole a logging tool comprising at least a sensor element having an outside surface adapted for contact with the borehole wall, comprising conductive and insulating portions arranged in a predetermined pattern on a substrate, said conductive and insulating portions being made of hard materials which are respectively electrically conductive and electrically insulating, each of said conductive and insulating portions being formed by layer deposition of, respectively, said conductive and insulating hard materials on said substrate.

26. A method of measuring the resistivity of formations traversed by a borehole, comprising the step of displacing along the borehole a logging tool including at least an electrical measurement sensor for contacting the borehole wall, comprising:

a metal support having an outside surface and an inside surface;

a first layer of a material that is hard and electrically insulating deposited on the outside surface of the support;

a layer of a material that is hard and electrically conductive deposited on a portion of the first layer and defining one or more electrodes;

at least one electrical through connection disposed inside or against the inside surface of the metal support;

electrical link elements deposited on the first layer, each having a first end connected to an electrode and a second end connected to one of the through connections; and a second layer of a material that is hard and electrically insulating, covering at least some of the electrical link elements.

* * * * *